United States Patent
Wilson

(10) Patent No.: US 7,523,710 B2
(45) Date of Patent: Apr. 28, 2009

(54) GRAIN DRILL WITH ACCURATE METERING OF THE RATE OF PLANTING OF SEED

(75) Inventor: David E. Wilson, Greensburg, IN (US)

(73) Assignee: Ken Vonmuenster, Anamosa, IA (US)

( * ) Notice: Subject to any disclaimer, the term of this patent is extended or adjusted under 35 U.S.C. 154(b) by 0 days.

(21) Appl. No.: 12/266,594

(22) Filed: Nov. 7, 2008

(65) Prior Publication Data

US 2009/0056605 A1 Mar. 5, 2009

Related U.S. Application Data

(60) Continuation of application No. 12/103,063, filed on Apr. 15, 2008, now Pat. No. 7,448,335, which is a continuation of application No. 11/838,445, filed on Aug. 14, 2007, now Pat. No. 7,357,087, which is a continuation of application No. 11/448,758, filed on Jun. 8, 2006, now Pat. No. 7,273,017, which is a division of application No. 10/821,858, filed on Apr. 12, 2004, now Pat. No. 7,059,258, which is a continuation of application No. 08/818,717, filed on Mar. 14, 1997, now Pat. No. 6,732,667.

(51) Int. Cl.
*A01C 7/00* (2006.01)

(52) U.S. Cl. .................. 111/200; 111/903; 111/900; 111/18; 111/64; 222/77; 177/139

(58) Field of Classification Search .................. 111/200, 111/903, 926, 170, 84, 8, 9, 18, 63, 64; 177/132, 177/136, 139, 145; 222/71, 77
See application file for complete search history.

(56) References Cited

U.S. PATENT DOCUMENTS

| 2,449,915 A | 9/1948 | Stalder |
| 2,766,104 A | 10/1956 | Gilmore |
| 3,065,808 A | 11/1962 | Dodgen |
| 3,317,088 A | 5/1967 | Funk et al. |

(Continued)

OTHER PUBLICATIONS

Digi-Star, Electric Scales brochure, pp. 1-6.

(Continued)

*Primary Examiner*—Christopher J. Novosad
(74) *Attorney, Agent, or Firm*—Antonelli, Terry, Stout & Kraus, LLP.

(57) ABSTRACT

The present invention is an improved grain drill and a method retrofitting a previously manufactured grain drill to provide accurate weight determination of seed in a seed hopper of the grain drill. A grain drill in accordance with the invention includes a frame having a plurality of wheels for supporting the grain drill during rolling over a surface of ground to be planted with seed grain; a hopper for containing the seed grain to be planted in the ground; a support which is joined to opposed sides of the frame and to spaced apart locations of the hopper to transfer weight of the hopper to the frame, the support including at least one weight sensing device which senses a weight of seed grain in the hopper transferred through the support to the frame and provides an output of the sensed weight of the seed grain in the hopper; and a display, coupled to the output, for displaying the weight of the seed grain contained in the hopper.

48 Claims, 11 Drawing Sheets

U.S. PATENT DOCUMENTS

| | | | |
|---|---|---|---|
| 3,847,238 A | 11/1974 | Hall et al. |
| 4,020,911 A | 5/1977 | English et al. |
| 4,044,920 A | 8/1977 | Swartzendruber |
| 4,411,325 A | 10/1983 | Hamilton |
| 4,465,211 A | 8/1984 | Van der Lely et al. |
| 4,539,921 A | 9/1985 | Morlock |
| 4,697,173 A | 9/1987 | Stokes |
| 4,714,122 A | 12/1987 | Appleton et al. |
| 4,742,880 A | 5/1988 | Schrag et al. |
| 4,865,457 A | 9/1989 | Strehlow |
| 5,199,518 A | 4/1993 | Woodle |
| 5,215,155 A | 6/1993 | Van Der Velden |
| 5,323,721 A | 6/1994 | Tofte et al. |
| 5,595,131 A | 1/1997 | Head, Jr. et al. |
| 5,664,402 A | 9/1997 | Sandvik et al. |
| 5,902,966 A | 5/1999 | Von Muenster |
| 6,091,997 A | 7/2000 | Flamme et al. |
| 6,150,617 A | 11/2000 | Hart et al. |
| 6,170,704 B1 | 1/2001 | Nystrom |
| 6,198,986 B1 | 3/2001 | McQuinn |
| 6,396,003 B1 | 5/2002 | Friesen |
| 6,525,276 B1 | 2/2003 | Vellidus et al. |
| 6,534,728 B1 | 3/2003 | Spikings |
| 6,732,667 B1 | 5/2004 | Wilson |

OTHER PUBLICATIONS

Digi-Star, Load Cells 7 Mounts brochure, pp. 1-2.
Weigh-Tronix, Farm Weigh Bar brochure, pp. 1-4.
(Indiana) Prairie Farmer, Mid-Jan. 1997, pp. 8-9, article entitled "Weighing Seed 'on-thego'" by Tom J. Bechman.
Farm Show, vol. 21, No. 1, 1997, p. 2, entitled "New Weight Scale for Deere 750 Grain Drills".
Progressive Farmer, Feb. 15, 1997, p. 46, entitled "Load Cells Give Drilling Peace of Mind".
Farm Show, vol. 20, No. 6, 1996, p. 3, entitled "Drill 'Weight Scale' for Planting Beans".

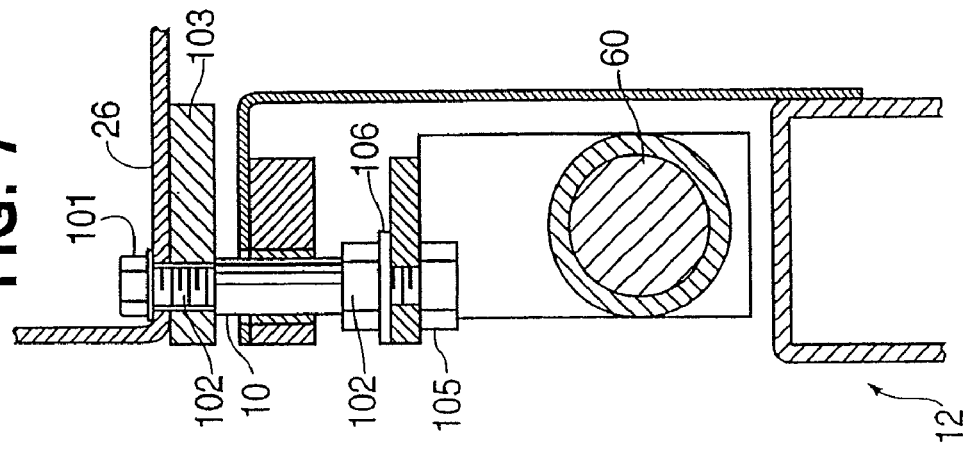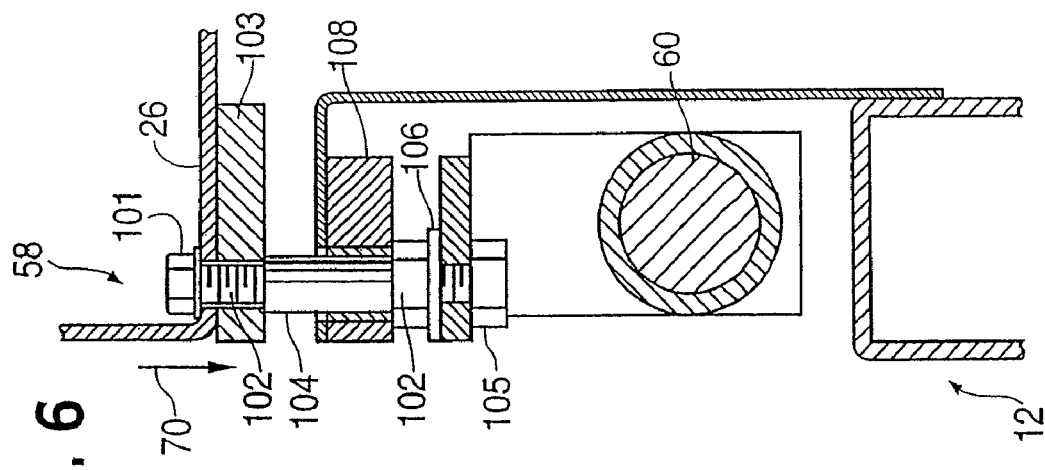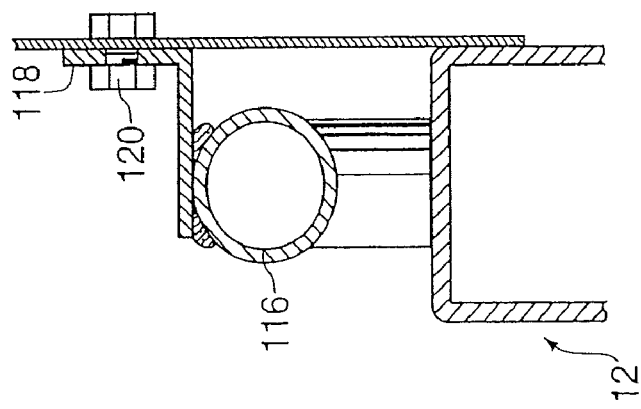

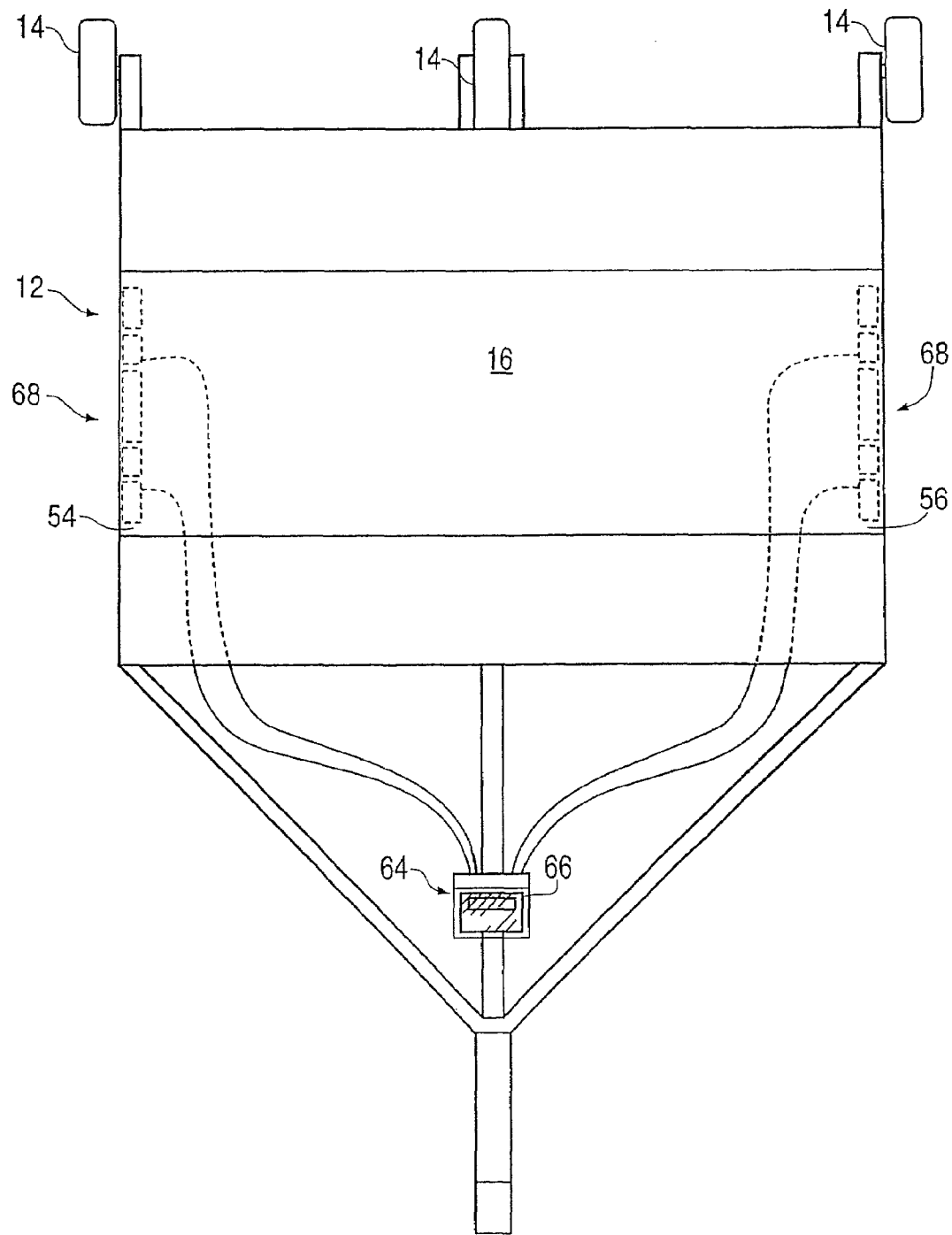

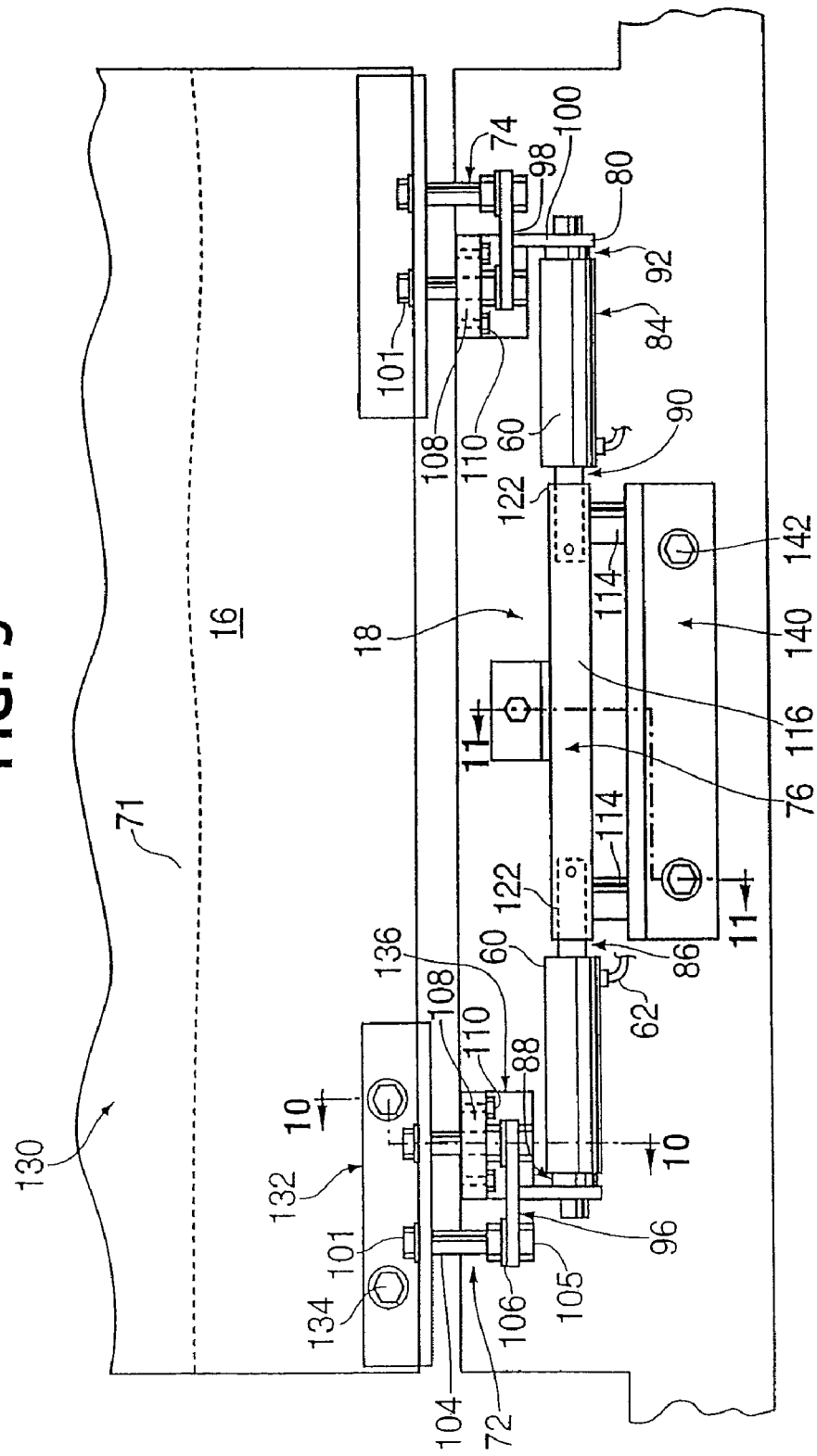

GRAIN DRILL WITH ACCURATE METERING OF THE RATE OF PLANTING OF SEED

CROSS-REFERENCE TO RELATED APPLICATIONS

This application is a continuation application of application U.S. Ser. No. 12/103,063, filed Apr. 15, 2008 (issuing as U.S. Pat. No. 7,448,335 on Nov. 11, 2008), which is a Continuation of U.S. Ser. No. 11/838,445, filed Aug. 14, 2007, now U.S. Pat. No. 7,357,087, which is a Continuation of U.S. Ser. No. 11/448,758, filed Jun. 8, 2006, now U.S. Pat. No. 7,273,017, which is a Divisional application of application Ser. No. 10/821,858, filed Apr. 12, 2004, now U.S. Pat. No. 7,059,258, which is a Continuation application of U.S. Ser. No. 08/818,717, filed Mar. 14, 1997, now U.S. Pat. No. 6,732,667, the subject matter of which applications are incorporated herein by reference in their entirety.

TECHNICAL FIELD

The present invention relates to grain drills used for planting grains, such as wheat and soybeans and, more particularly, to grain drills providing an accurate rate of metering of the planting of seed.

BACKGROUND ART

Numerous manufacturers sell grain drills which are utilized extensively throughout the world for planting grains, such as wheat, soybeans, oats, barley, etc. Grain drills are towed by tractors and plant wide swaths, such as 10 or more feet, with a single pass. The towing of the grain drill with a tractor provides the power for the metered planting of the seed into the furrows. Grain drills further may be either of the no till type, which do not require previous plowing and discing of the ground, or the till type, which require previously plowing and discing of the ground.

Commercially available grain drills are highly sophisticated machines which provide tremendous efficiency enabling farmers to plant large tracts of land with grain. A typical soybean farmer may plant a thousand or more acres a year with a single grain drill. Thus, anything which adversely affects the operation of a grain drill has tremendous impact on the economics of farming using grain drills.

Commercially available grain drills do not contain on-board devices which permit the farmer to accurately determine the rate of planting of seed per acre in terms of weight per acre. A grain drill has an acreage counter which indicates approximately the number of acres which have been covered during planting. However, commercially available grain drills do not have on-board weighing devices which permit the weight of seed, such as wheat, soybeans, oats, barley, etc. to be accurately determined while planting is ongoing.

Seeds may be purchased in bags having a uniform weight, such as 50 lbs., which permits the farmer to load the hopper of a grain drill with an accurately weighed amount of seed which ultimately permits the farmer to determine the rate of planting of seed in weight per acre by dividing the total number of acres which have been planted during the time that the seed was planted by the number of preweighed bags used to fill the grain drill seed hopper times the weight of seed per bag. The filling of the hopper with preweighed bags of seed is cumbersome, requires the opening of individual bags involving substantial time, and prevents the farmer from purchasing seed in bulk. Seed purchased in bulk is cheaper which would result in a net savings of the cost per acre for planting if the farmer could accurately determine the weight of the bulk seed which would permit the foregoing calculation of pounds of seed per acre to be made to enable the farmer to determine the actual rate of planting in terms of weight per acre. However, the purchase of seed in bulk does not provide the farmer with an accurate determination of the weight of seed which is placed in the hopper. Therefore, after the filling of a grain drill hopper with seed from a bulk source is completed, while the farmer can determine approximately the total number of acres which were planted from the acre counter, there is no accurate measure of the weight of the seed which was placed in the hopper from a bulk purchase or container.

Thus, farmers today who use state of the art grain drills are faced with a constant dilemma of how to accurately determine the rate of planting of seed in terms of weight per acre to accurately control the rate of planting which permits optimization of crop yield. That dilemma either requires the purchase of seed in preweighed bags with its attendant inefficiencies and additional expense or makes it impossible for the farmer to calculate the weight rate of planting of seed in an accurate manner which results typically in not planting the grain seed at the ideal weight rate per acre which is necessary to optimize yield.

Furthermore, even if the farmer knows precisely the weight of seed which is placed in the hopper of a grain drill, there is no current mechanism for "on the fly" determination of the rate of planting of seed in pounds per acre as the drill is operated before the seed hopper is emptied. Commercially available grain drills have a mechanical calibrated metering device which has a linear scale having increasing numbers which represent an increased rate of planting. However, because of the variation of the size of seed which is planted and the different types of seeds which are planted with a grain drill, the numerically graduated scale for controlling the rate of planting provides nothing about the weight rate of seed being planted and provides information on only a relative rate of planting.

Experienced farmers develop an understanding of the desired rate of planting of seed in terms of weight measure per acre. If the farmer accurately plants seed with a grain drill at the optimum rate, the yield of the resultant crop is optimized and further, the overall cost of seed to obtain the maximum crop yield is reduced. On one hand, if less than the optimum quantity of seed per acre is planted, the resultant yield will be less than the optimum yield resulting in the farmer realizing less income per acre than would be realized if the optimum rate of seed was planted per acre. On the other hand, if the rate of planting of seed is too great per acre, a decreased yield is realized, which is less than the optimum yield, resulting in the waste of seed which represents a substantial expense to the farmer. Also, the resultant plants may be down because of their high density, which makes it difficult for the farmer to combine the plants at harvest. For example, if a farmer is planting 1,000 acres of soybeans with a grain drill and makes a mistake of overestimating the rate of planting of seeds at a rate of 5 lbs. per acre, a total of 5,000 lbs. of wasted seed occurs which represents a substantial expense over $1,000.00 with no return on investment and a possible lessened yield because of over density in planting.

Additionally, with current state of the art grain drills, while the rate of deposition of seed may be varied by changing the setting of the control of the relative rate of planting of seed, there is no way for the farmer on the fly to determine the actual rate of planting of seed by planting only a small area. As previously described, the only way to precisely determine the weight rate of planting seed is to accurately count the number of preweighed bags of seed which are placed in the hopper and after the entire hopper is planted, the total weight of seed in the hopper is computed by multiplying the number of bags used by the weight of seed per bag and that total weight is divided by the number of planted acres. This process is time consuming and wasteful because if the rate of planting of seed is set either too high or too low, all of the land which was planted with the seed from the full hopper is not optimally planted at the right rate to maximize the yield and to reduce the expense of seed to the minimum amount per acre.

Additionally, while commercially available grain drills may contain a sight glass for viewing if there is seed in the drill, such viewing devices do not provide a view when the drill is close to being empty. This forces the farmer into the situation that it is possible for the hopper to be empty while the farmer is continuing to plant seed. The resultant acreage must be reseeded or worse, may not be seeded at all until after the seed germinates. In any event, because of the pressures that are involved with weather conditions to plant seed with a grain drill at the right time, the farmer requires the ability to know precisely when additional seed must be added to the hopper which may necessitate a helper to go to a seed supplier to obtain seed at the end of the day after the seed supplier is closed. If the farmer cannot accurately determine what the weight of seed is in the hopper at all times, it may be impossible to determine with enough lead time that additional seed must be purchased from the seed supplier or otherwise obtained from the farmer's storage of seed.

Thus, while it is highly desirable for a farmer to know the weight rate of planting of seed per acre and further the quantity of seed in the hopper of a grain drill at all times, none of the currently commercially available grain drills permit an accurate determination on the fly of the amount of seed present in the hopper and furthermore, do not permit the calculation of the weight rate of planting of seed over a small number of acres less than the number of acres required to empty exhaust all of the preweighed seed which has been placed in the hopper. There is a long-felt need in farming to provide a low cost and accurate device for determining the weight rate of planting of seed per acre and further the weight of seed at all times in the hopper of a grain drill.

FIG. 1 schematically illustrates a Model 750 no till grain drill 10 manufactured by the John Deere Company. The grain drill 10 is comprised of a rigid frame 12 having a plurality of wheels 14 for supporting the drill during rolling over a surface of ground to be planted with grain and a grain hopper 16 for containing the grain to be planted in the ground. The grain drill has a no till planting mechanism 17 which is comprised of a plurality of no till planting units 19 which extend away from the grain hopper 16 to the ground as illustrated in FIGS. 1 and 3. The planting mechanism 17 receives seeds from the grain hopper 16 and conveys the seeds to the no till planting units 19 which bury the seeds below the ground in a known manner.

The frame 12 has a pair of longitudinally extending frame members 18 which are hollow in rectangular hollow cross section and which are part of the rigid support of the grain drill. The frame 12 further has a plurality of cross frame members, not illustrated, which extend across the full width of the drill to form a rectangular space frame for supporting the weight of the seed hopper 16 across the width of the grain drill. While FIG. 1 illustrates a single seed hopper 16, it should be understood that wider grain drills have two seed hoppers bolted side by side to the frame, as illustrated in FIG. 3, which represents a John Deere Model 750 grain drill, such as, for example, permitting a 20-foot grain drill to be formed from two 10-foot seed hoppers which are individually used on 10-foot grain drills. The plurality of cross members are connected to the longitudinally extending frame members 18 to define the overall rigid space frame structure from which the plurality of wheels 14 are suspended. Each hopper 16 is bolted to the longitudinally extending members 18 at four corners thereof. The entire frame structure of the grain drills of FIGS. 1 and 3 is conventional and well known.

FIG. 2 illustrates an enlarged section of the longitudinal side of the grain drill 10 of FIG. 1. As illustrated, the outboard portion of the longitudinally extending frame member 18 is removed by removing bolts (not illustrated) to permit access from underneath in opening 19 to the horizontally extending member 22 as illustrated. In the Model 750 and other commercially available grain drills from John Deere, a total of eight holes 24 are drilled through the horizontal member 22 and face the bottom horizontal surface 26 of hopper 16. Pairs of the holes 24 face the four bottom corners of hopper 16. Eight tapped holes 28 extend through the bottom horizontal surface 26 and are in alignment with the holes 24 to permit the rigid attachment of the hopper 16 to the frame 12 by threading fasteners 30 through the hole 24 into engagement with the threads of a corresponding hole 28 as illustrated. The use of fasteners 30 in the prealigned holes 24 and 28 permits the farmer to readily remove the hopper if service is required or otherwise removal is necessary and further simplifies the manufacturing process. The fasteners 30 provide an extremely strong and rigid connection so that the hopper 16 does not shift relative to the frame 12 and further applies the weight of the grain in the hopper to the frame 12 when loaded and rolling across the surface of the ground during planting in the conventional manner.

As illustrated, the opening 19 on the outboard side of the horizontally extending frame members 18 provides access to secure the fasteners 30 from underneath to the holes 24 and 28 at the manufacturing facility and thereafter to permit the farmer to have access if necessary to either tighten the fasteners or to remove them if the hopper 16 is to be removed from the frame 12.

The grain drill 10 contains a conventional acreage counter 32 which provides a running count of the number of acres planted and consists of a rotary set of wheels similar to that of a speedometer which are calibrated to read the actual number of acres which are planted and a control 34 for setting the rate of planting of seeds. The control 34 has a series of teeth which interlock with a movable handle which is rotated relative to a graduated numerically calibrated scale for setting the rate of planting. The rate of planting is calibrated such that higher numbers indicate a higher rate of planting but not in terms of a calibrated seed weight rate per acre. However, it should be understood that while the acreage counter is reasonably accurate in practice, there is no available mechanism to calibrate the weight per acre of seeds which are being planted purely by use of the control 34 with the only effective mechanism being to distribute preweighed seeds and divide the weight by the number of acres planted as described above.

FIG. 3 illustrates a prior art grain drill 11 which is generically in accordance with FIG. 1, except that two seed hoppers 16 are mounted side by side. Grain drills 11 for planting wide swaths include multiple hoppers 16, such as two side by side hoppers as illustrated. The frame 12 is wider than the prior art of FIG. 1 to support the increased weight, but overall the function of the grain drill 11 is the same as the prior art grain drill 10 of FIG. 1 and also has the same deficiencies as described above of not providing the farmer with the ability to determine the weight of seed in the hopper and the weight rate of planting of seed on the fly.

U.S. Pat. Nos. 2,449,915, 4,465,211, 4,539,921, 4,697,173, 5,595,131 and 5,323,721 disclose systems used for the planting of seeds. U.S. Pat. No. 4,465,211 discloses a weight indicator for a seeder but such device has no application to grain drills because of its construction. U.S. Pat. No. 2,449,915 discloses an indicator for indicating the level of seed in a seed hopper but does not disclose any weighing mechanism. U.S. Pat. No. 4,539,921 discloses a modular drill frame construction. U.S. Pat. No. 4,697,173 discloses a monitoring apparatus which monitors various parameters of agricultural seeding, including the level of seeds stored in a hopper of a seeder and a sensor for providing a measure of the rate of movement of the seeder over the ground. U.S. Pat. No. 5,959,131 discloses a flexible and resilient support for a grain box of a grain drill. U.S. Pat. No. 5,323,721 discloses a planter monitoring system which determines a number of parameters of planting. None of the aforementioned patents discloses a mechanism which may be used to accurately weigh the seed within a hopper of a grain drill and to provide the farmer with an accurate measure of the weight rate of seeds being planted.

DISCLOSURE OF THE INVENTION

The present invention is an improved grain drill which senses the weight of seed grain in a hopper which contains the seed to be planted and further, a method for modifying a grain drill having a frame including a plurality of wheels for supporting the grain drill during rolling over a surface of ground to be planted with grain and a hopper joined to the frame for containing the seed grain to be planted to sense the weight of seed grain in the hopper. In accordance with the invention, a support is joined to opposed sides of the frame and to spaced apart locations of the hopper to transfer weight of the hopper to the frame and includes at least one weight sensing device which senses the weight of seed grain in the hopper transferred through the support to the frame. The at least one weight sensing device provides an output of the sensed weight of the seed grain in the hopper which is coupled to a display for displaying the weight of the seed grain contained in the hopper so as to provide the operator of a tractor towing the grain drill with an accurate indication of the weight of seed grain contained in the hopper at all times.

The present invention provides substantial advantages to operators of grain drills in comparison to the prior art described above. By providing the operator of a grain drill with an accurate weight of the seed in the hopper at all times, including during planting operations, several operational advantages are realized. First, the control for setting the rate of planting may be readily accurately calibrated for diverse types and different sizes of seed grains in terms of weight per acre being planted after the planting of a few acres to fine tune the rate of planting to a desired weight rate of grain seed per acre. The calibration is simply achieved by the operator determining the weight of the seed grain, which is planted over a small number of acres which are indicated to have been planted by the acreage counter, to calculate the weight rate of seed grain planted per acre by simply dividing the total weight of seed grain planted by the number of acres planted. If the initial setting of the control controlling the rate of planting in the prior art is either too high or too low, the control is then moved in the opposite sense to adjust the rate of planting of seed grain to the desired planting rate of weight per acre which the farmer wishes to achieve during planting. The precise calibration of the rate of planting of seed grain in terms of weight per acre can be achieved after an initial calibration and possibly one more calibrations after resetting of the control controlling the relative rate of planting to achieve the desired rate of planting in terms of weight per acre which provides the farmer with a substantial cost savings because, as explained above, planting seed grain at the optimum rate provides the greatest crop yield at the smallest possible seed grain cost per acre thereby maximizing the farmer's economic yield per acre. Additionally, the invention by providing the farmer with a continuous display of the weight of seed grain in the seed grain hopper, enables the farmer to make arrangements for the acquiring of additional seed grain to refill the hopper prior to running out of seed grain which, in the prior art, often resulted in a substantial loss of time to the farmer because the farmer was required to determine how much area was not planted because the hopper had run out of seed grain. Furthermore, the continuous display of the weight of seed grain in the hopper permits the farmer to exhaust one type of seed grain in the hopper and change over to another type of seed grain without substantial mixing of the two seed grain types. It is highly desirable for farmers to use different types of seed grains for planting a crop to provide a hedge against a bad yield for one seed grain type by providing another seed grain type during the same planting which will provide a higher yield in different weather conditions which would not produce a high yield for the first seed grain type. Finally, as explained above, the farmer may purchase seed grain in bulk quantities which is cheaper than buying it in preweighed bags to thereby lessen the cost of seed grain per acre in planting and lessen the time and effort required to load the hopper of the grain drill by permitting use of powered conveyers or other types of seed grain transporting devices which supply seed grain from bulk containers which eliminates the hand labor and low efficiency of opening individual seed grain bags.

When the present invention is used to retrofit an existing grain drill, such as a drill from the John Deere Company, as illustrated in the prior art of FIGS. 1-3, only minor modifications are required to the existing unit because the fitting of a support, which transfers weight of the seed grain in the hopper to the frame, is retrofitted to use the same holes which are used to attach the frame to the hopper with fasteners as described above at the time of manufacturing or, alternatively, requires simple additional attachments of the support to the hopper and the frame.

The purchase cost of the present invention from a farm equipment supplier may be recovered by a farmer in a single year by permitting the farmer to accurately calibrate the weight of planting of seed grain which saves wasted seed grain and lowered yield from over planting and reduced yield from under planting.

Furthermore, while a preferred embodiment of the present invention locates the support for transferring the weight from the hopper through a weight sensing device in the support directly underneath the hopper and within the longitudinally extending frame members on both sides of the drill, it should be understood that the present invention may be alternatively practiced with a support transferring the weight from the hopper outboard of the longitudinally extending frame members through a weight sensing device to the frame at a point of attachment on an outside surface of the longitudinally extending frame member so as to permit any design of grain drill, including those without any accessible opening underneath the frame 12, as described in conjunction with the prior art of FIG. 2, to be utilized with the practice of the present invention.

The present invention utilizes weight sensing devices which preferably are commercially purchased load cells which are configured into the support to transfer the weight of the hopper to the frame for producing an output signal which is displayed from a commercially available display unit which decodes the individual weights sensed by each load cell and converts the individual weights sensed by each load cell into a cumulative total weight display of the seed grain contents of the hopper. Each of outputs from the individual weight sensing devices located in the support are electrically connected to the display with individual electrical cables which provides the aforementioned display of the total weight sensed by each of the weight sensing devices. Preferably, at least four weight sensing devices are utilized with the present invention. In applications of the invention where two or more hoppers are used in a side by side configuration, such as FIG. 3, an odd number of weight sensors may be used per hopper when a common support for two frames being utilized inboard of the sides of the grain drill.

The present invention is a grain drill comprising a frame having a plurality of wheels for supporting the grain drill during rolling over a surface of ground to be planted with grain; a hopper for containing the grain to be planted in the ground; a support which is joined to opposed sides of the frame and to spaced apart locations of the hopper to transfer weight of the hopper to the frame, the support including at least one weight sensing device which senses a weight of seed grain in the hopper transferred through the support to the frame and provides an output of the sensed weight of the seed grain in the hopper; and a display, coupled to the output, for displaying the weight of seed grain contained in the hopper. The support comprises a pair of weight bearing supports which are respectively joined to opposed sides of the frame, each weight bearing support including first and second vertical parts which are respectively attached to the hopper at the spaced apart locations separated along a longitudinal dimension of the grain drill and a horizontal part joined to the vertical parts and attached to the frame. The at least one weight sensing device comprises first and second load cells associated with each of the pair of weight bearing supports, the first load cell being loaded with weight transferred from the first vertical part to the horizontal part and the second load cell being loaded with weight transferred from the second vertical part to the horizontal part. A first end of the first and second vertical parts is attached to the hopper and a second end of the first and second vertical parts is respectively attached to spaced apart positions of the horizontal part to transfer the weight of the seed grain in the hopper to the horizontal part; and the horizontal part has first and second horizontal extensions, the first horizontal extension having a first end which is coupled to the frame and includes the first load cell and the second end which is deflected downward by the weight of the seed grain in the hopper and which is attached to the second end of the first vertical part and the second horizontal extension having a first end which is attached to the frame and includes the second load cell and the second end which is deflected downward by the weight of the seed grain in the hopper and which is attached to the second end of the second vertical part. The support frame includes at each of the opposed sides a horizontal member, each horizontal member having at least first and second spaced apart holes extending vertically through the horizontal member and which respectively receive and allow vertical movement of a portion of the first and second vertical parts, the holes restricting horizontal movement of a hopper relative to the frame by confining the portion of the first and second vertical parts to within the holes. The first and second vertical parts comprise a horizontal piece attached to one end of a vertical piece and another end of the vertical piece being the second end of the vertical part, at least one connector extending from the horizontal piece through one of the holes and being vertically moveable therein and into engagement with the hopper. At least a pair of connectors extend from the horizontal piece at opposed ends thereof spaced from a point of attachment of the vertical piece to the horizontal piece. Each connector is threaded and engages threads in the hopper at one of the spaced apart positions of the hopper. A bushing is located in each hole and securely engages each connector to prevent horizontal movement of the connector relative to the bushing. The spaced apart positions are located at four corners of the hopper and the support is attached to the four corners by engagement with a bottom part of the hopper.

Each weight bearing support does not to extend beyond a width of a portion of the frame to which the weight bearing support is attached or, alternatively, at least one of the weight bearing supports is mounted at least in part extending beyond a width of a portion of the frame to which the weight bearing support is attached.

A method for modifying a grain drill having a frame having a plurality of wheels for supporting the grain drill during rolling over a surface of ground to be planted with seed grain and a hopper joined to the frame for containing the seed grain to be planted comprises raising the hopper upward from the frame to separate the hopper from being joined to the frame; positioning a support between the hopper and the frame to join the support to opposed sides of the support and to spaced apart locations of the hopper to support the hopper in a raised position above the frame, the positioned support transferring weight of the hopper to the frame, including at least one weight sensing device which senses a weight of the seed grain in the hopper transferred through the support to the frame and which provides an output of the sensed weight of the seed grain in the hopper; and providing a display for displaying on the grain drill the weight of the seed grain contained in the hopper. The construction of the support utilized with the foregoing method is preferably as described above.

BRIEF DESCRIPTION OF DRAWINGS

FIG. 5 is a sectional view of FIG. 4 taken along section line 5-5 of FIG. 4.

FIG. 6 is a sectional view of FIG. 4 taken along section line 6-6 of FIG. 4.

FIG. 7 is a sectional view identical to FIG. 6 illustrating the effect of weight loading from the hopper on the support.

FIG. 8 is a top plan view of a grain drill including the support of the invention in accordance with FIGS. 4-7.

FIGS. 9-11 illustrate a second embodiment of a grain drill including a support in accordance with the present invention which has the support extending outside the vertical side wall of the longitudinal frame members and the outboard sides of the grain drill.

Like reference numerals identify like parts throughout the drawings.

BEST MODE FOR CARRYING OUT THE INVENTION

Figure 1:
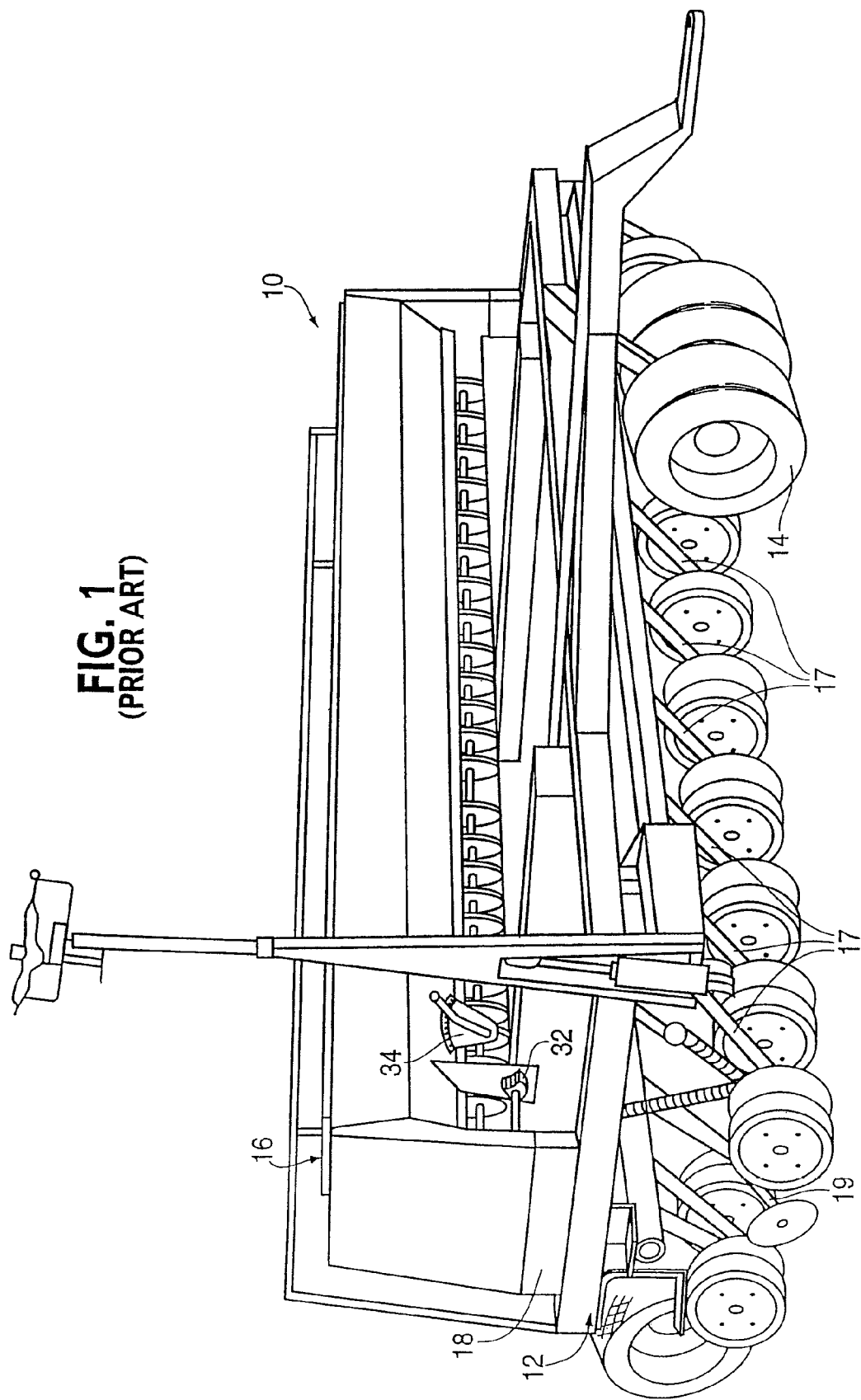
FIG. 1 is a perspective schematic view of a prior art grain drill.
Figure 2:
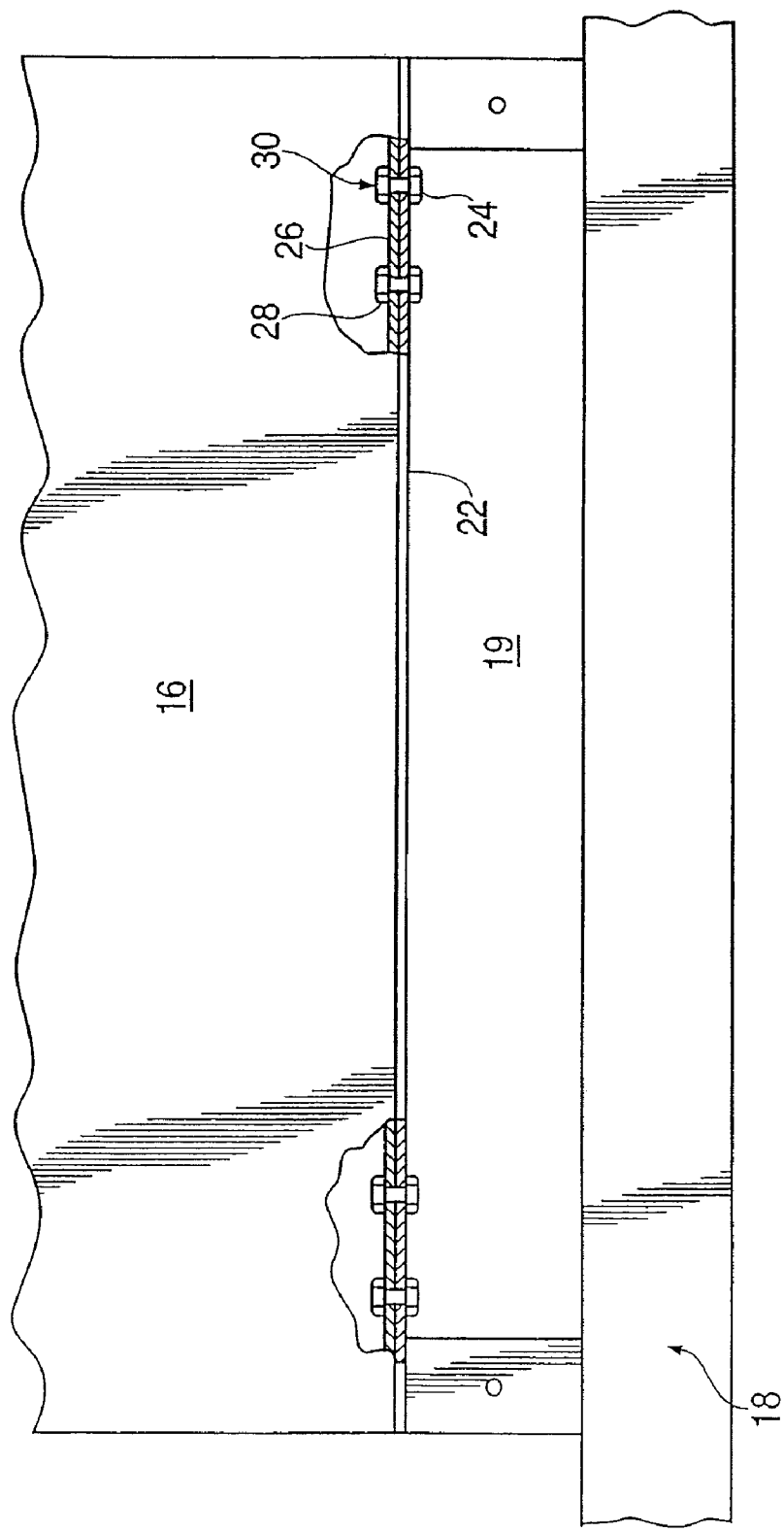
FIG. 2 is an enlarged view of a portion of the prior art grain drill of FIG. 1 showing the joining of the seed hopper directly to the frame with threaded fasteners.
Figure 3:
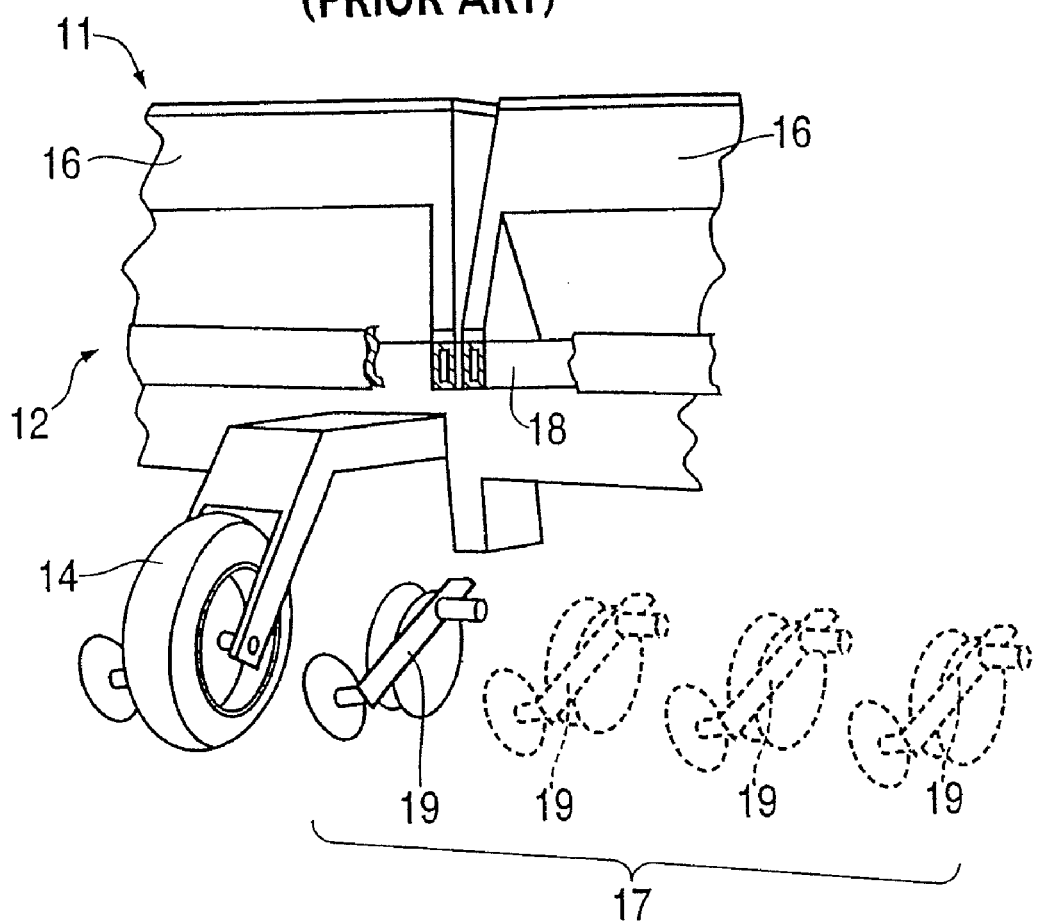
FIG. 3 is a prior art view of a grain drill having multiple side by side seed hoppers.

FIGS. 4-8 illustrate a preferred embodiment 50 of a grain drill in accordance with the present invention which is a modification of the prior art of FIGS. 1-3 described above. The prior art has been modified to provide a support 52 which is joined to a first opposed side 54 and a second opposed side 56, as illustrated in FIG. 8, of the frame 12 and to spaced apart locations 58 of the hopper 16 which are preferably at the four corners of the bottom surface 26 thereof to transfer weight of the hopper and seed grain therein to the frame. The support 52 includes at least one weight sensing device 60 which each preferably is a commercially purchased load cell of the one inch weigh bar type having a calibration diameter of 2⅛" manufactured by the Weight Tronix Company of Fairmont, Minn. The weight sensing devices 60 function to generate an accurate output of sensed weight which is a function of vertically downward deflection 70 caused by the application of the weight of the seed grain 71 in the hopper 16 thereto as described below. Each of the weight sensing devices 60 has an output cable 62 which is connected to a display 64. The display 64 is preferably Part Number 12980 also manufactured by Weight Tronix Company, which is designed to total the sensed output weights from each of the weight sensing devices 60 and generate a display 66 of the total weight of seed grain 71 in the hopper 16 to enable the farmer to visually determine from a tractor towing the grain drill 50 the weight of seed grain in the hopper at all times. It should be understood that the invention is not limited to the particular choice of weight sensing devices 60 in the form of load cells and the display 64.

In a preferred form of the present invention, the support 52 is comprised of a pair of weight bearing supports 68 which fit into the hollow space 19 underneath the horizontal member 22 of the longitudinally extending frame members 18 as described above in FIG. 2. As illustrated in FIG. 8, the individual weight bearing supports 68, which comprise the support 52, are located at opposed sides of the grain drill and are separated by the width thereof. As a result of the weight bearing supports 68 fitting below the horizontal member 22 within the hollow rectangular cross section of space 19 of the longitudinally extending frame members 18, the weight of the hopper 16 is transferred directly downward through the holes 24 through each weight bearing support 68 to the frame 12 as described in more detail below. The transfer of the weight from the hopper 16 directly downward to the weight bearing supports 68 causes a vertically downward deflection 70 of the individual weight sensing devices 60 proportional to the sensed weight which produces the aforementioned output of the weight 66 of seed grain 71 in the hopper 16 on display 64.

Each weight bearing support 68 includes first and second vertical parts 72 and 74 which are respectively attached to the hopper 16 at the spaced apart locations 58 of the bottom surface 26 of the hopper which are preferably at the four corners of the hopper and mounted in a line parallel to a longitudinal dimension of the longitudinally extending frame members 18 of the grain drill and a horizontal part 76 joined to the vertical parts and attached to the frame 12. As illustrated, each weight bearing support 68 includes first and second weight sensing devices 60. The first weight sensing device 60 of the weight bearing support 68 is loaded with weight transferred from the first vertical part 72 to the horizontal part 76 and the second weight sensing device is loaded with weight transferred from the second vertical part 74 to the horizontal part 76. A first end 78 of the first and second vertical parts 72 and 74 is attached to the hopper 16 and a second end 80 of the first and second vertical parts is respectively attached to spaced apart locations of the horizontal part 76 to transfer the weight of the seed grain 71 in the hopper to the horizontal part to load the weight sensing devices 60 therein. The horizontal part 76 has a first horizontal extension 82 and a second horizontal extension 84. The first horizontal extension 82 has a first end 86 which is coupled to the frame 12 and includes the first load sensing device 60 and a second end 88 which is deflected downward as indicated by arrow 70 by the weight of the seed grain 71 in the hopper 16 and which is attached to the second end 80 of the first vertical part 72 and the second horizontal extension 84 has a first end 90 which is coupled to the frame 12 and includes the second weight sensing device 60 and a second end 92 which is deflected downward by the weight of the seed grain in the hopper as also indicated by arrow 70 and which is attached to the second end 80 of the second vertical part 74.

As described above, the frame 12 includes at each of the opposed sides of the longitudinally extending frame member 18, a horizontal member 22. Each horizontal member 22 has at least first and second spaced apart holes 24 extending vertically through the horizontal member and which respectively slidably receive a portion of the first and second vertical parts 72 and 74. The holes 24 restrict horizontal movement of the hopper 16 relative to the frame 12 by confining the portion of the first and second vertical parts 72 and 74 to within the holes.

Each of the first and second vertical parts 72 and 74 have multiple parts. A horizontal piece 96 is attached to one end 98 of a vertical piece 100. The other end of the vertical piece 100 is the second end 80 of the first and second vertical parts 72 and 74 which respectively are attached to the ends of first and second horizontal extensions 82 and 84. A pair of threaded connectors 102 project upward from the horizontal piece 96 through the holes 24 and into threaded engagement with the threads within holes 28 of the bottom 26 of the hopper 16. A nut 101, as illustrated in FIGS. 6 and 7, may be placed onto a portion of the threads of the connectors 102 which project upward beyond a bottom surface of the bottom 26. Furthermore, the invention is not limited to any type or number of connectors but threaded connectors are preferred because they may be chosen to have threads which engage the threads in the bottom 26 of the hopper 16 which are used by the manufacturer to attach the hopper to the frame 12. The use of the aligned holes 24 and 28 and threaded connectors 102 to engage the threads in the holes 28 in the bottom of the hopper 16, which are used by the manufacturer, facilitates the retrofitting of support 52 to an existing grain drill in accordance with the prior art of FIGS. 1-3.

The aforementioned portion of the first and second vertical parts 72 and 74 which engages the hopper 16 should have at least one connector 102 extending from the horizontal piece 96 and through one of the pair of holes 24 and 28 and into engagement with tapped threads in the bottom horizontal surface 26 of the hopper 16. Preferably, as illustrated, a pair of connectors 102 extend from each horizontal piece 96 to engage a different one of the four corners 58 of the hopper 16 to provide a four point suspension of the hopper which provides both high rigidity and even weight transfer of the seed grain 71 in the hopper 16 to the weight sensing devices 60 within the weight bearing supports 68. Bushing 104 fits slidable within an enlargement of the hole 24 of the prior art of FIGS. 1-3 within horizontal member 22 and receives the threaded connectors 102 which transfer the weight of the seed grain 71 from the hopper 16 down through the load sensing devices 60 to the frame 12.

Each connector 102 preferably is attached to respective ends of the horizontal piece 96 by drilling holes in the respective ends and using a nut 105 and washer 106 to secure the connector into engagement with the hole. Furthermore, a block 108 is attached to the spaced apart locations 58 of the hopper 16 with threaded connectors 110. The block 108 has a hole 112 drilled therein to tightly receive the bushing 104 to reinforce the sliding engagement of the support 52 relative to the horizontal member 22.

Additionally, each weight bearing support 68 has a pair of spaced apart support feet 114 which extend vertically downward from a horizontal rod 116 to which the individual weight sensing devices 60 are attached. Also attached to horizontal rod 116 is a bracket 118 which is secured to the frame 12 by a threaded fastener 120. The feet 114 transfer the weight of the hopper 16 loaded directly onto the weight sensing devices 60 as a consequence of being located relatively close to the ends 86 of the attachment of the weight sensing devices 60 to the outboard ends 122 of the horizontal rod 116.

The foregoing grain drill may be retrofitted to an existing grain drill such as, but not limited to, the prior drills of FIGS. 1-3 by raising the hopper(s) 16 from the illustrated portions of FIGS. 1-3 to separate the hopper from being joined to the frame 12. Thereafter, the aforementioned support 52, as described above, is positioned between the hopper 16 and the frame 12 as described above in FIGS. 4-7 to join the support to the opposed sides 54 and 56 of the frame and to spaced apart locations 58 of the hopper to support the hopper in a raised position above the frame as illustrated in FIGS. 4-7. The display 64 is attached to the frame 12 by welding a support bracket to the frame or attaching the support bracket to the frame with threaded connectors at a position permitting an operator to view a numerical display of the weight 66 from the tractor pulling the grain drill. The positioned support 52 transfers the weight of the hopper 16 to the frame 12 in the manner as described above. Thus, the present invention is applicable to both new construction of grain drills or to retrofitting existing grain drills without extensive modification of the manufacturing process or extensive labor for the retrofitting process as a consequence of the support 52 being positionable in the previously drilled holes 24 in the horizontal member 22 of the longitudinally extending members 18 and the previously drilled holes 28 of the bottom 26 of the hopper.

While the invention in a preferred embodiment mounts the support 52 directly below the horizontal member 22 within the opening 19 of the longitudinally extending frame members 18, in grain drills which do not have access from below the upward most part of the frame 12 facing the hopper 16, the load of the hopper may be transferred outboard of the outside face of the frame 12 of the grain drill with a support 130 as illustrated in a second embodiment of a grain drill in FIGS. 9-11 in accordance with the present invention. Alternatively, the load of the hopper 16 may be transferred at least in part inboard of the outside longitudinal frame members 18 to an inside face of the frame 12 of the grain drill with a support 170 as illustrated in a third embodiment in FIGS. 12-14.

Figure 4:
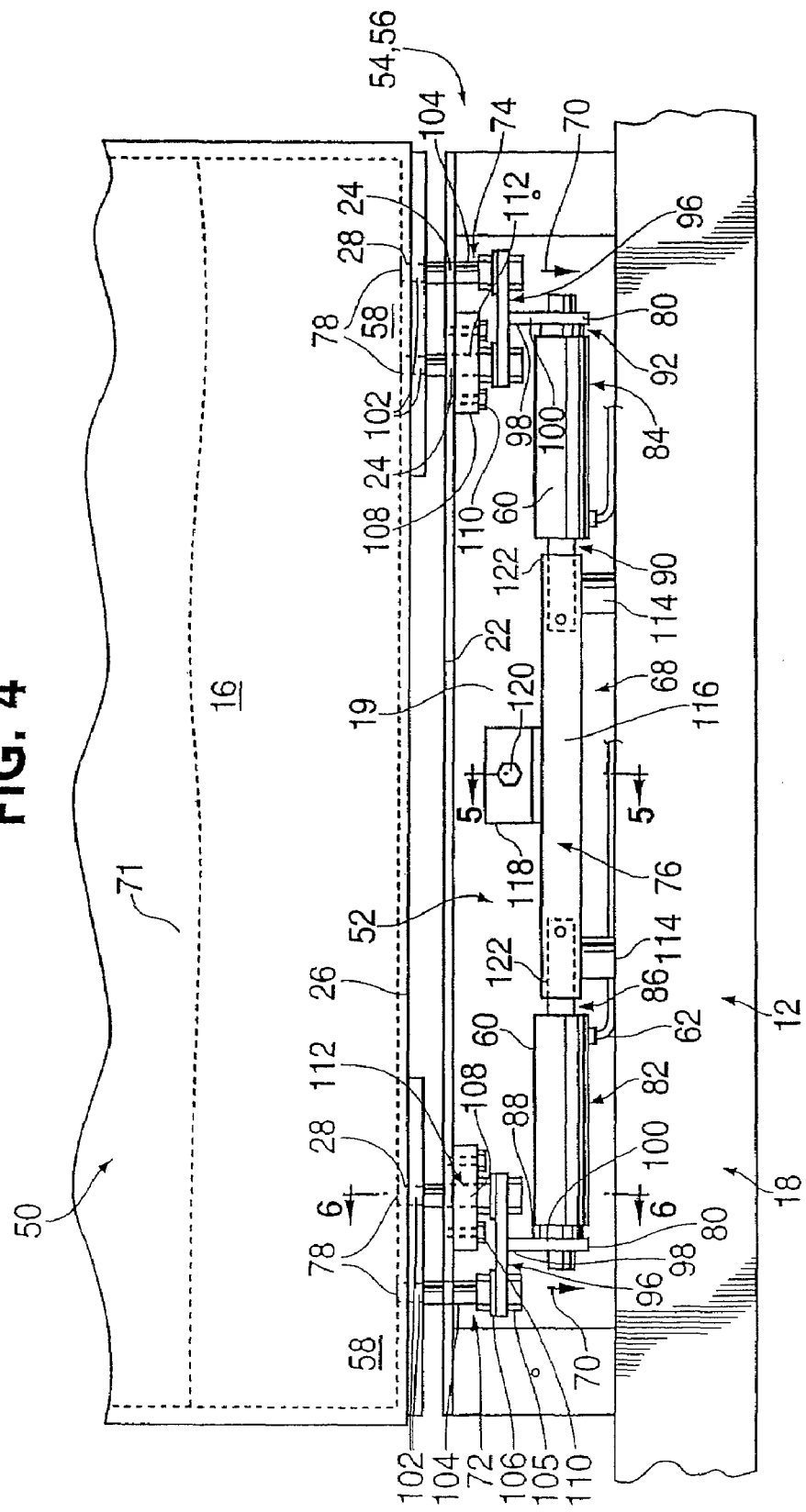
FIG. 4 is a side elevational view of a first embodiment of a grain drill including a support in accordance with the invention for transferring weight from the seed hopper to the frame which may be used to modify the prior art grain drill of FIGS. 1 and 2 to display a weight of seed grain in the hopper.
Figure 10:
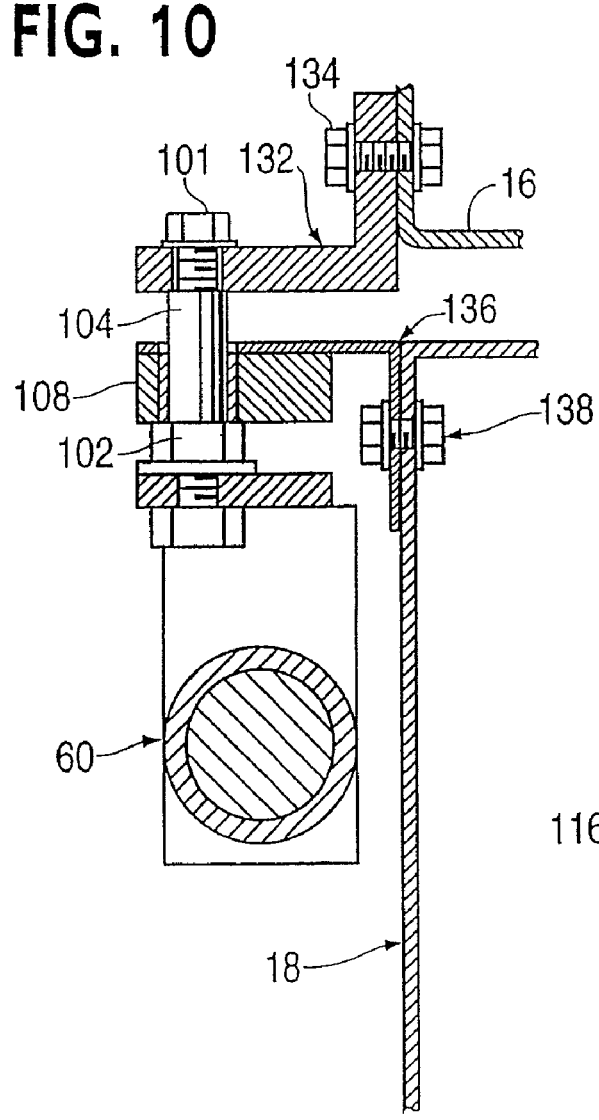
Figure 11:
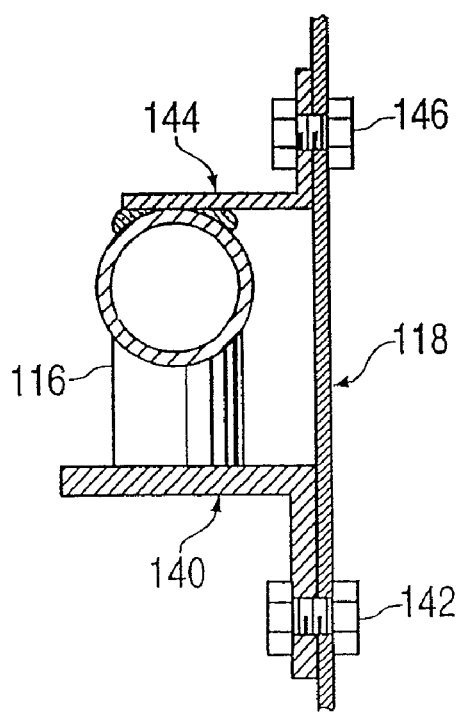

FIGS. 9-11 illustrate a second embodiment of a support 130 in accordance with the present invention which differs from the first embodiment 52 in that the support does not fit directly vertically below the hopper 16 in the space 19 as illustrated in FIG. 4. Certain reference numerals which are common to FIG. 4 have been omitted. Instead, the support 130 has a plurality of angle brackets 132, 136, 140 and 144 which directly bolt to a vertical outside side faces of the hopper 16 and the longitudinal frame members 18 as illustrated. The first angle bracket 132 bolts to the vertical sidewall of the hopper 16 with a connector 134 and the second angle bracket 136 bolts to the vertical sidewall of the longitudinal frame member 18 with connector 138. The angle bracket 140 bolts to the vertical sidewall of the longitudinal member 18 with connector 142 and the angle bracket 144 also bolts to the vertical sidewall of the longitudinal member 18 with connector 146. As illustrated, this embodiment transfers the weight of the seed in the hopper 16 from the hopper through the support 130 through the at least one load sensing device 60 to the longitudinal frame member 18 via the foregoing angle brackets 132, 136, 140 and 144. This embodiment preferably has four weight sensing devices deployed in the same manner as the first embodiment. This design may be used to retrofit grain drills or for a new construction of grain drills where there is no opening 19 directly below the hopper 16 as in the embodiment of FIGS. 4-8.

Figure 12:
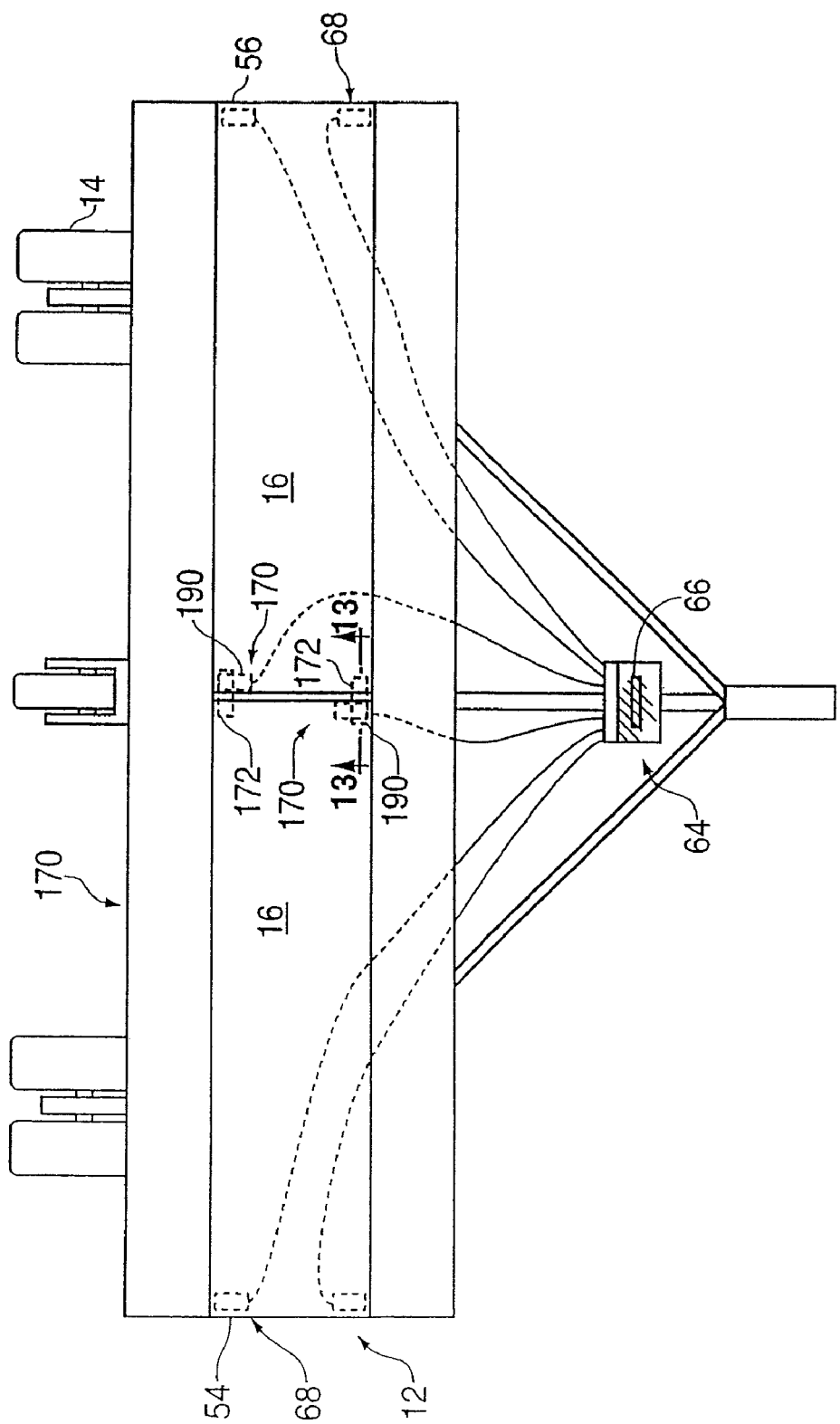
FIGS. 12-14 illustrate a third embodiment of a grain drill in accordance with the invention having side by side grain hoppers such as the prior art of FIG. 3 including a support having inboard weight bearing supports located at opposed corners of side by side hoppers.
Figure 13:
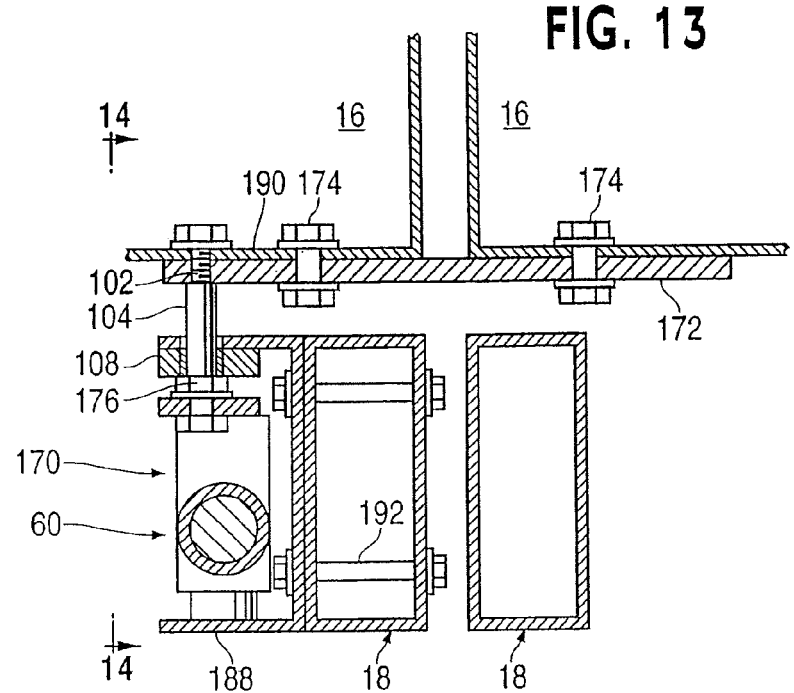
Figure 14:
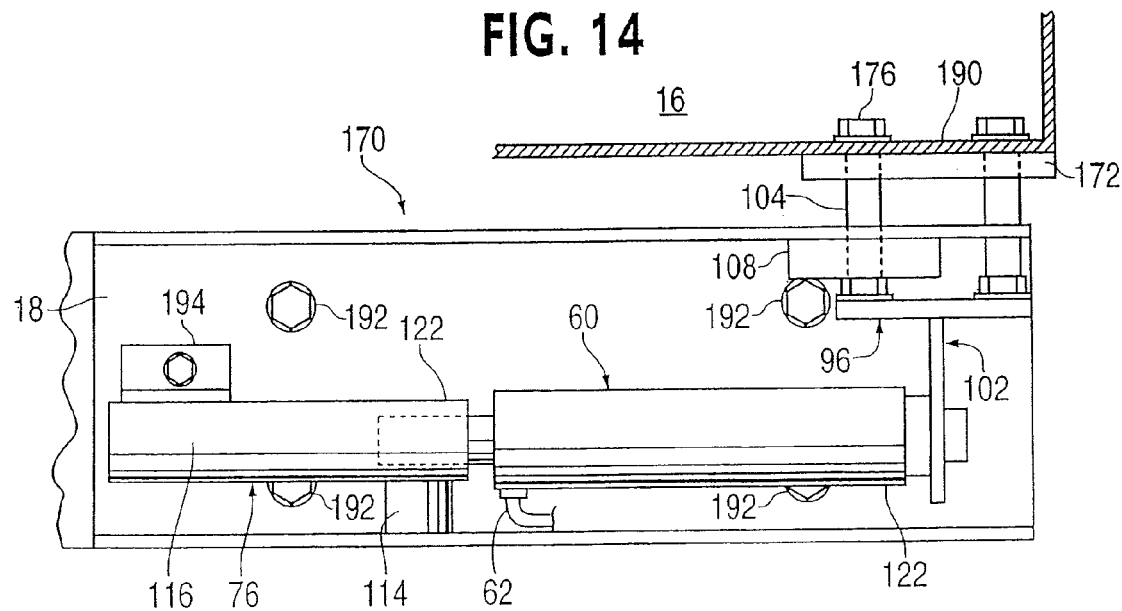

The third embodiment of a grain drill of the present invention includes a support 170 which differs from the first two embodiments in providing the total weight of grain within tandem hoppers 16 as illustrated in FIGS. 12-14. Certain reference numerals which are common to FIG. 4 have been omitted. A plurality of weight bearing supports are utilized in the third embodiment 170. The weight bearing supports 68 are located on the outboard sides as illustrated and may be identical to the first and second embodiments as described above. On the inboard sides of the tandem hopper 16, a pair of weight bearing supports 170 are located diagonally at the respective front and rear corners of the inboard sides of the individual hoppers 16 as illustrated in FIG. 12. A pair of plates 172, as illustrated in FIG. 13, are disposed at the diagonal corners of the tandem hoppers 16 to provide a support at the front and rear of the hoppers.

Each plate 172 is bolted to the individual tandem hoppers 16 with fasteners 174. Individual weight sensing devices 60 are located at each of the weight bearing supports 170 which provide a two point support for the inboard sides of the tandem hoppers 16 at the diagonal corners 190 that transfers the weight of the seed in the hoppers to the longitudinal frame members 18. Individual fasteners 176 attach a member 188 to the plate 172 which is attached to the corner 190 of the side by side hoppers with fasteners 174. The member 188 is also bolted to the longitudinal frame member 18 with fasteners 192. An angle bracket 194 attaches the inboard end of horizontal rod 116 to the horizontal member 18. The outboard end 122 of the horizontal rod 116 is attached to the weight sensing member 60. The overall function of the third embodiment of the weight bearing supports 170 is similar to that of the first and second embodiments. The distinction is that the weight of the seed in the tandem hoppers 16 on the inboard side is transferred through the weight bearing supports to the side of the longitudinal frame members 18 through the use of plates 172 which provide support for the overall weight of the hoppers through the weight bearing supports including the at least one weight sensing device 60 instead of resting directly on the frame as in the prior art of FIG. 3.

Figure 15:
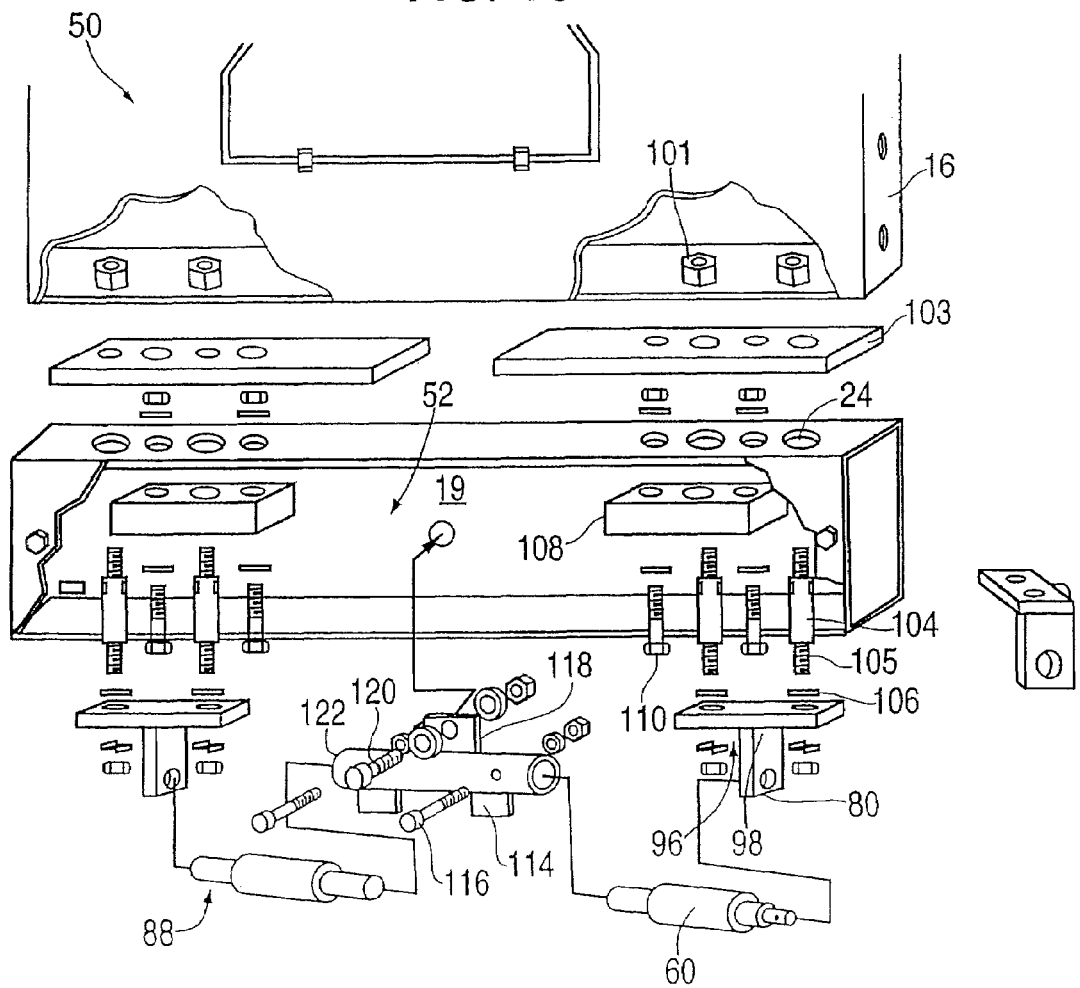
FIG. 15 is an exploded diagram of a commercial embodiment of the present invention which may be retrofitted to a Model 750 grain drill from the John Deere Company which is very similar to the first embodiment of the support of FIGS. 4-8.

FIG. 15 illustrates an exploded view of the present invention which is commercially sold for retrofitting to a Model 750 John Deere Grain Drill. Its construction is similar to the first embodiment 50 with the principal difference being its illustration in exploded form.

The present invention, as explained above in the various embodiments, may be configured in different geometrical constructions to provide a support which transfers the weight of seed grain 71 from the hopper 16 to the frame 12 of grain drills of diverse designs to permit accurate sensing of the weight of the seed grain with the advantages as described above.

The overall process of utilizing the present invention to optimize the rate of planting of seed grain with the grain drill is as follows. Initially, the farmer sets the control 34 to an estimated rate of planting of seed grain which the farmer believes to be as close as possible to the desired weight rate of planting per acre. After planting one or more acres, the total acreage planted is determined from reading the count of the acreage counter 32 and is divided into the number of pounds of seed grain planted, as indicated by the decrease in weight of seed grain in the hopper 16 by the display 64, to determine the actual weight of seed grain planted per acre. After the calculation of the actual weight of planting of seed grain per acre, the control 34 is adjusted upward or downward to move the rate of planting from the actual rate of planting, assuming it is different from the desired rate of planting, toward the desired rate of planting. This process may go through one or more iterations until a highly accurate rate of planting is achieved.

While the present invention has been described in terms of its preferred embodiment, it is intended that numerous modifications may be made thereto without departing from the spirit and scope of the invention. It is intended that all such modifications fall within the scope of the appended claims.

The invention claimed is:

1. A seed planter comprising:
   a frame including a plurality of wheels for rolling over a surface of ground to be planted with seeds;
   a seed container for containing seeds to be planted in the ground;
   a support which is joined to the frame and to the seed container for transferring weight of the seed container to the frame, the support including at least one means for sensing weight which senses a weight transferred through the support to the frame and which provides an output of sensed weight; and
   a planting mechanism which receives seeds contained in the seed container and plants the seeds received from the seed container below the ground.

2. A seed planter in accordance with claim 1 wherein:
   the at least one means for sensing weight comprises at least one load cell for being loaded with weight of the seed container and any seed therein transferred from the seed container through the at least one load cell to the frame.

3. A method for modifying a seed planter including a frame including a plurality of wheels for rolling over a surface of ground to be planted with seeds, a seed container joined to the frame for containing the seed to be planted and a planting mechanism which receives seeds contained in the seed container and plants seeds received from the seed container below the ground comprising:
   separating the seed container from being joined to the frame; and
   positioning a support between the seed container and the frame to join the support to the frame and to the seed container, the positioned support transferring weight of the seed container and any seed therein to the frame and including at least one means for sensing weight which senses a weight transferred through the support to the frame and which provides an output of the sensed weight.

4. A method in accordance with claim 3 wherein:
   the at least one means for sensing weight comprises at least one load cell for being loaded with weight of the seed container and any seeds therein transferred from the seed container through the at least one load cell to the frame.

5. A seed planter comprising:
   a frame having a plurality of wheels for supporting the planter during rolling over a surface of ground to be planted with seeds;
   a seed container for containing seeds to be planted in the ground;
   a support which is joined to the frame and to the seed container for transferring weight of the seed container and any seeds therein to the frame, the support including at least one means for sensing weight which senses a weight of the seed container and any seeds therein transferred through the support to the frame and provides an output of the sensed weight; and
   a planting mechanism which receives seeds contained in the seed container and plants the seeds received from the container below the ground.

6. A seed planter in accordance with claim 5 wherein the at least one means for sensing weight comprises at least one load cell associated with the support.

7. A method for modifying a seed planter including a frame having a plurality of wheels for supporting the seed planter during rolling over a surface of ground to be planted with seeds, a seed container joined to the frame for containing seed to be planted, and a planting mechanism which plants seeds received from the container below the ground comprising:
   raising the seed container upward from the frame to separate the seed container from being joined to the frame;
   positioning a support between the seed container and the frame to join the support to the frame and to the seed container to support the seed container in a raised position above the frame, the positioned support transferring weight of the seed container and any seeds therein to the frame and including at least one means for sensing weight which senses a weight of the seed container and any seeds therein transferred through the support to the frame and which provides an output of the sensed weight; and
   the planting mechanism receiving seeds contained in the seed container and planting the seeds received from the container below the ground.

8. A method in accordance with claim 7 wherein the at least one means for sensing weight comprises at least one load cell associated with the support.

9. A method for modifying a seed planter including a frame having a plurality of wheels for supporting the seed planter during rolling over a surface of ground to be planted with seeds, a seed container joined to the frame for containing seed to be planted, and a planting mechanism which plants seeds received from the seed container below the ground comprising:
   raising the seed container upward from the frame to separate the seed container from being joined to the frame;
   positioning a support between the seed container and the frame to join the support to the frame and to the seed container to support the seed container above the frame, the positioned support transferring weight of the seed container and any seeds therein to the frame;
   at least one means for sensing weight which senses a weight of the seed container and any seeds therein transferred through the support to the frame and which provides an output of the sensed weight of the seed container and any seeds therein including during planting of the seeds during rolling over the surface of the ground; and the planting mechanism receiving seeds contained in the seed container and planting the seeds received from the container below the ground.

10. The method of claim 9 wherein the at least one means for sensing weight comprises at least one load cell associated with the support.

11. A scale for use with a seed planter including a frame supported by ground engaging wheels, a seed container for containing seeds and being supported by a frame, a planting mechanism which plants the seeds contained in the seed container below the ground which flow from the seed container to the planting mechanism while the ground engaging wheels roll across the ground during planting of the seeds in the ground, the scale comprising at least one means for sensing weight of the seed container that suspends the seed container, the at least one means for sensing weight being mounted so that weight of the seed container and any seeds therein is supported through the at least one means for sensing weight and providing an output of the sensed weight.

12. A scale in accordance with claim 11 wherein the at least one means for sensing weight comprises at least one load cell.

13. A method of planting seeds with a seed planter including a frame including a plurality of wheels for rolling over a surface of ground to be planted with seeds, a seed container for containing seeds to be planted in the ground, a support which is joined to the frame and to the seed container to transfer weight of the seed container to the frame, the support including at least one means for sensing weight which senses a weight transferred through the support to the frame and which provides an output of sensed weight, and a planting mechanism which receives seeds contained in the seed container and plants the seeds received from the seed container below the ground comprising:

in response to the output of the sensed weight displaying with a display a weight of the seeds contained in the seed container while planting seeds in the ground with the planting mechanism.

14. A method in accordance with claim 13 comprising:

determining a weight of seeds being planted per unit area from the seed container by the planting mechanism while planting is ongoing by using the displayed weight of seeds in the seed container.

15. A method in accordance with claim 14 wherein:

the at least one means for sensing weight comprises at least one load cell for being loaded with weight of the seed container and any seeds therein transferred from the seed container through the at least one load cell to the frame.

16. A method in accordance with claim 13 wherein:

the at least one means for sensing weight comprises at least one load cell for being loaded with weight of the seed container and any seeds therein transferred from the seed container through the at least one load cell to the frame.

17. A method of planting seed with a seed planter including a frame having a plurality of wheels for supporting the planter during rolling over a surface of ground to be planted with seeds, a seed container for containing seeds to be planted in the ground, a support which is joined to the frame and to the seed container to transfer weight of the seed container and any seeds therein to the frame, the support including at least one means for sensing weight which senses a weight of the seed container and any seeds therein transferred through the support to the frame and provides an output of the sensed weight, and a planting mechanism which receives seeds contained in the seed container and plants the seeds received from the seed container below the ground comprising:

in response to the output of the sensed weight displaying with a display a weight of the seeds contained in the seed container while planting seeds in the ground with the planting mechanism.

18. A method in accordance with claim 17 comprising:

determining a weight of seeds being planted per unit area from the seed container by the planting mechanism while planting is ongoing by using the displayed weight of seeds in the seed container.

19. A method in accordance with claim 18 wherein:

the at least one means for sensing weight comprises at least one load cell associated with the support.

20. A method in accordance with claim 17 wherein:

the at least one means for sensing weight comprises at least one load cell associated with the support.

21. A method of planting seeds with a scale provided by a seed planter including a frame supported by ground engaging wheels, a seed container for containing seeds which is supported by a frame, a planting mechanism which plants the seeds contained in the seed container below the ground which flows from the seed container to the planting mechanism while the ground engaging wheels roll across the ground during planting of the seeds in the ground, the scale comprising at least one means for sensing the weight of the seed container so that weight of the seed container and seeds therein is supported through the at least one means for sensing weight and providing an output of the sensed weight comprising:

in response to the output of the sensed weight displaying with a display a weight of the seeds contained in the seed container while planting seeds in the ground with the planting mechanism.

22. A method in accordance with claim 21 comprising:

determining a weight of seeds being planted per unit area from the seed container by the planting mechanism while planting is ongoing by using the displayed weight of seeds in the seed container.

23. A method of planting seeds in accordance with claim 22 wherein:

the at least one means for sensing weight comprises at least one load cell for being loaded with weight of the seed container and any seeds therein transferred from the seed container through the at least one load cell to the frame.

24. A method of planting seeds in accordance with claim 21 wherein:

the at least one means for sensing weight comprises at least one load cell for being loaded with weight of the seed container and any seeds therein transferred from the seed container through the at least one load cell to the frame.

25. A seed planter comprising:

a frame including a plurality of wheels for rolling over a surface of ground to be planted with seed;

seed containers for containing seeds to be planted in the ground;

a support which is joined to the frame and to the seed containers for transferring weight of the seed containers to the frame, the support including a plurality of means for sensing weight of the seed containers which sense weight transferred through the support to the frame and which provides an output of sensed weight with at least one means for sensing weight being associated with each seed container; and a planting mechanism which receives seeds contained in the seed containers and plants the seeds received from the seed containers below the ground.

26. A seed planter in accordance with claim 25 wherein:
the plurality of means for sensing weight comprise load cells for being loaded with weight of the seed containers and any seeds therein transferred from the seed containers through the load cells to the frame.

27. A method for modifying a seed planter including a frame including a plurality of wheels for rolling over a surface of ground to be planted with seeds, seed containers joined to the frame for containing the seeds to be planted and a planting mechanism which receives seeds contained in the seed containers and plants seeds received from the seed containers below the ground comprising:
separating the seed containers from being joined to the frame; and
positioning a support between the seed containers and the frame to join the support to the frame and to the seed containers, the positioned support transferring weight of the seed containers and any seeds therein to the frame and including a plurality of means for sensing weight which sense a weight transferred through the support to the frame from the container and which provides an output of the sensed weight with at least one means for sensing weight being associated with each seed container.

28. A method in accordance with claim 27 wherein:
the plurality of means for sensing weight comprise load cells for being loaded with weight of the seed containers and any seeds therein transferred from the seed containers through the load cells to the frame.

29. A seed planter comprising:
a frame having a plurality of wheels for supporting the planter during rolling over a surface of ground to be planted with seeds;
seed containers for containing seeds to be planted in the ground;
a support which is joined to the frame and to the seed containers for transferring weight of the seed containers and any seeds therein to the frame, the support including a plurality of means for sensing weight which sense weight of the seed containers and any seeds therein transferred through the support to the frame and provides an output of the sensed weight with at least one means for sensing weight being associated with each seed container; and
a planting mechanism which receives seeds contained in the seed containers and plants the seeds received from the container below the ground.

30. A seed planter in accordance with claim 29 wherein the means for sensing weight comprise load cells associated with the support.

31. A method for modifying a seed planter including a frame having a plurality of wheels for supporting the seed planter during rolling over a surface of ground to be planted with seeds, seed containers joined to the frame for containing seeds to be planted, and a planting mechanism which plants seeds received from the seed containers below the ground comprising:
raising the seed containers upward from the frame to separate the seed containers from being joined to the frame;
positioning a support between the seed containers and the frame to join the support to the frame and to the seed containers to support the seed containers in a raised position above the frame, the positioned support transferring weight of the seed containers and any seeds therein to the frame and including a plurality of means for sensing weight which sense a weight of the seed containers and any seeds therein transferred through the support to the frame and which provides an output of the sensed weight with at least one means for sensing weight being associated with each seed container; and
the planting mechanism receiving seeds contained in the seed containers and planting the seeds received from the seed containers below the ground.

32. A method in accordance with claim 31 wherein the means for sensing weight comprise load cells associated with the support.

33. A method for modifying a seed planter including a frame having a plurality of wheels for supporting the seed planter during rolling over a surface of ground to be planted with seeds, seed containers joined to the frame for containing seeds to be planted, and a planting mechanism which plants seeds received from the seed containers below the ground comprising:
raising the seed containers upward from the frame to separate the seed containers from being joined to the frame;
positioning a support between the seed containers and the frame to join the support to the frame and to the seed containers to support the seed containers above the frame, the positioned support transferring weight of the seed containers and any seeds therein to the frame;
a plurality of means for sensing weight which sense weight of the seed containers and any seeds therein transferred through the support to the frame and which provides an output of the sensed weight of the seed containers and any seeds therein including during planting of the seeds during rolling over the surface of the ground with at least one means for sensing weight being associated with each seed container; and
the planting mechanism receiving seeds contained in the seed containers and planting the seeds received from the container below the ground.

34. The method of claim 33 wherein the means for sensing weight comprise load cells associated with the support.

35. A scale for use with a seed planter including a frame supported by ground engaging wheels, seed containers for containing seeds and being supported by the frame, a planting mechanism which plants the seeds contained in the seed containers below the ground which flow from the seed containers to the planting mechanism while the ground engaging wheels roll across the ground during planting of the seeds in the ground, the scale comprising a plurality of means for sensing weight of the seed containers that suspends the seed containers from the frame, the plurality of means for sensing weight being mounted so that weight of the seed containers and any seeds therein is supported by the frame through the plurality of means for sensing weight and providing an output of the sensed weight with at least one means for sensing weight being associated with each seed container.

36. A scale in accordance with claim 35 wherein the plurality of means for sensing weight comprises load cells.

37. A method of planting seeds with a seed planter including a frame including a plurality of wheels for rolling over a surface of ground to be planted with seeds, seed containers for containing seeds to be planted in the ground, a support which is joined to the frame and to the seed containers to transfer weight of the seed containers to the frame, the support including a plurality of means for sensing weight which sense weight transferred through the support to the frame and which provides an output of sensed weight with at least one means for sensing being associated with each seed container, and a planting mechanism which receives seeds contained in the seed containers and plants the seeds received from the seed containers below the ground comprising:

in response to the output of the sensed weight displaying with a display a weight of the seeds contained in the seed containers while planting seeds in the ground with the planting mechanism.

38. A method in accordance with claim 37 comprising:

determining a weight of seeds being planted per unit area from the seed containers by the planting mechanism while planting is ongoing by using the displayed weight of seeds in the seed container.

39. A method in accordance with claim 38 wherein:

the plurality of means for sensing weight comprise load cells for being loaded with weight of the seed containers and any seeds therein transferred from the seed container through the at least one load cell to the frame.

40. A method in accordance with claim 37 wherein:

the plurality of means for sensing weight comprise load cells for being loaded with weight of the seed containers and any seeds therein transferred from the seed container through the at least one load cell to the frame.

41. A method of planting seeds with a seed planter including a frame having a plurality of wheels for supporting the planter during rolling over a surface of ground to be planted with seeds, seed containers for containing seeds to be planted in the ground, a support which is joined to the frame and to the seed containers to transfer weight of the seed containers and any seeds therein to the frame, the support including a plurality of means for sensing weight which senses a weight of the seed containers and any seeds therein transferred through the support to the frame with at least one means for sensing weight being associated with each seed container and provides an output of the sensed weight, and a planting mechanism which receives seeds contained in the seed containers and plants the seeds received from the seed containers below the ground comprising:

in response to the output of the sensed weight displaying with a display a weight of the seeds contained in the seed containers while planting seeds in the ground with the planting mechanism.

42. A method in accordance with claim 41 comprising:

determining a weight of seeds being planted per unit area from the seed containers by the planting mechanism while planting is ongoing by using the displayed weight of seeds in the seed containers.

43. A method in accordance with claim 42 wherein:

the plurality of means for sensing weight comprise load cells associated with the support.

44. A method in accordance with claim 41 wherein:

the plurality of means for sensing weight comprise load cells associated with the support.

45. A method of planting seeds with a scale associated with a seed planter including a frame supported by ground engaging wheels, seed containers for containing seeds which are supported by a frame, a planting mechanism which plants the seeds contained in the seed containers below the ground which flow from the seed containers to the planting mechanism while the ground engaging wheels roll across the ground during planting of the seeds in the ground, the scale including a plurality of means for sensing weight of the seed containers so that weight of the seed containers and seeds therein is supported by the plurality of means for sensing weight with at least one means for sensing being associated with each seed container and providing an output of the sensed weight comprising:

in response to the output of the sensed weight displaying with a display a weight of the seeds contained in the seed containers while planting seeds in the ground with the planting mechanism.

46. A method in accordance with claim 45 comprising:

determining a weight of seeds being planted per unit area from the seed containers by the planting mechanism while planting is ongoing by using the displayed weight of seeds in the seed containers.

47. A method of planting seeds in accordance with claim 45 wherein:

the plurality of means for sensing weight comprises load cells for being loaded with weight of the seed containers and any seeds therein transferred from the seed containers through the load cells to the frame.

48. A method of planting seeds in accordance with claim 45 wherein:

the plurality of means for sensing weight comprises load cells for being loaded with weight of the seed containers and any seeds therein transferred from the seed containers through the load cells to the frame.

* * * * *

(12) EX PARTE REEXAMINATION CERTIFICATE (8640th)
United States Patent
Wilson

(10) Number: US 7,523,710 C1
(45) Certificate Issued: Oct. 25, 2011

(54) GRAIN DRILL WITH ACCURATE METERING OF THE RATE OF PLANTING OF SEED

(75) Inventor: David E. Wilson, Greensburg, IN (US)

(73) Assignee: Digi-Star, LLC, Fort Atkinson, WI (US)

Reexamination Request:
No. 90/011,223, Oct. 20, 2010

Reexamination Certificate for:
Patent No.: 7,523,710
Issued: Apr. 28, 2009
Appl. No.: 12/266,594
Filed: Nov. 7, 2008

Related U.S. Application Data

(63) Continuation of application No. 12/103,063, filed on Apr. 15, 2008, now Pat. No. 7,448,335, which is a continuation of application No. 11/838,445, filed on Aug. 14, 2007, now Pat. No. 7,357,087, which is a continuation of application No. 11/448,758, filed on Jun. 8, 2006, now Pat. No. 7,273,017, which is a division of application No. 10/821,858, filed on Apr. 12, 2004, now Pat. No. 7,059,258, which is a continuation of application No. 08/818,717, filed on Mar. 14, 1997, now Pat. No. 6,732,667.

(51) Int. Cl.
*A01C 7/00* (2006.01)

(52) U.S. Cl. ............................ 111/200; 111/18; 111/64; 111/900; 111/903; 177/139; 222/77

(58) Field of Classification Search ..................... 111/200
See application file for complete search history.

(56) References Cited

U.S. PATENT DOCUMENTS

| 4,100,538 A | 7/1978 | Knepler |
| 4,411,325 A | 10/1983 | Hamilton |

FOREIGN PATENT DOCUMENTS

| DE | 3137435 A1 | 5/1983 |
| EP | 0537857 A2 | 4/1993 |

OTHER PUBLICATIONS

Staveley Weighing & Systems Group, Weigh–Tronix Farm Weigh Bar Kits, 1994, p. 1–4.

*Primary Examiner*—Peter C. English

(57) ABSTRACT

The present invention is an improved grain drill and a method retrofitting a previously manufactured grain drill to provide accurate weight determination of seed in a seed hopper of the grain drill. A grain drill in accordance with the invention includes a frame having a plurality of wheels for supporting the grain drill during rolling over a surface of ground to be planted with seed grain; a hopper for containing the seed grain to be planted in the ground; a support which is joined to opposed sides of the frame and to spaced apart locations of the hopper to transfer weight of the hopper to the frame, the support including at least one weight sensing device which senses a weight of seed grain in the hopper transferred through the support to the frame and provides an output of the sensed weight of the seed grain in the hopper; and a display, coupled to the output, for displaying the weight of the seed grain contained in the hopper.

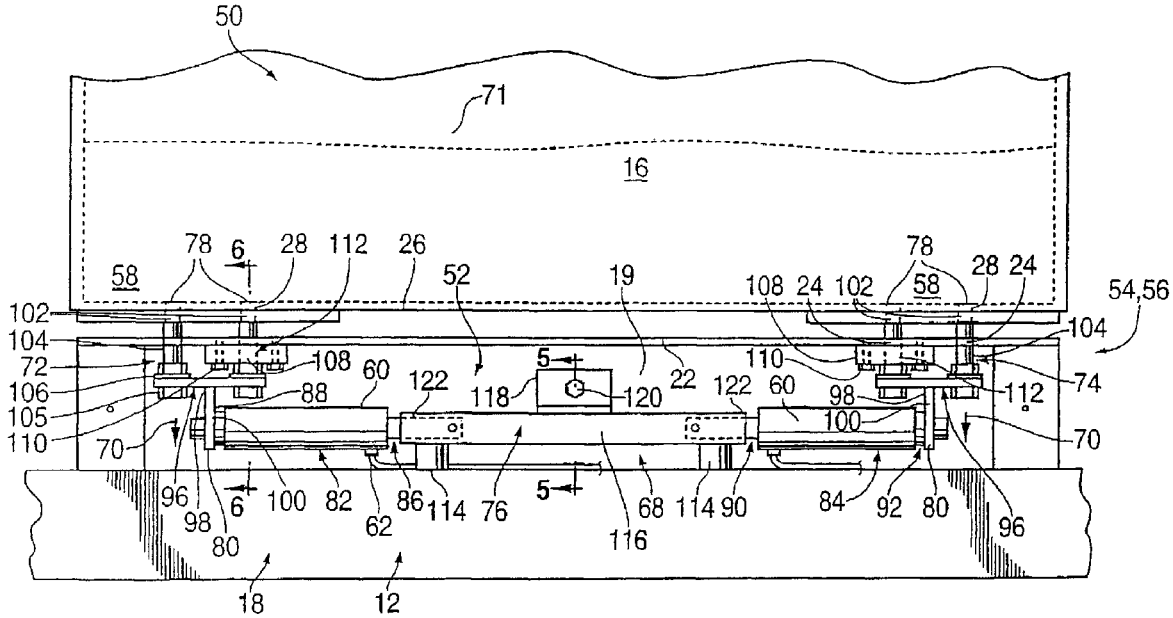

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 4, 6, 8, 10, 12, 15, 16, 19, 20, 23, 24, 26, 28, 30, 32, 34, 36, 39, 40, 43, 44, 47 and 48 are cancelled.

Claims 1, 3, 5, 7, 9, 11, 13, 17, 21, 25, 27, 29, 31, 33, 35, 37, 41 and 45 are determined to be patentable as amended.

Claims 14, 18, 22, 38, 42 and 46, dependent on an amended claim, are determined to be patentable.

New claims 49-84 are added and determined to be patentable.

1. A seed planter comprising:
a frame including a plurality of wheels for rolling over a surface of ground to be planted with seeds;
a seed container for containing seeds to be planted in the ground;
a support which is joined to the frame and to the seed container for transferring weight of the seed container to the frame, the support including at least one means for sensing weight which senses a weight transferred through the support to the frame and which provides an output of sensed weight; and
a planting mechanism which receives seeds contained in the seed container and plants the seeds received from the seed container below the ground; *and wherein the at least one means for sensing weight comprises at least one load cell for being loaded with weight of the seed container and any seed therein transferred from the seed container through each load cell to the frame.*

3. A method for modifying a seed planter including a frame including a plurality of wheels for rolling over a surface of ground to be planted with seeds, a seed container joined to the frame for containing the seed to be planted and a planting mechanism which receives seeds contained in the seed container and plants seeds received from the seed container below the ground comprising:
separating the seed container from being joined to the frame; and
positioning a support between the seed container and the frame to join the support to the frame and to the seed container, the positioned support transferring weight of the seed container and any seed therein to the frame and including at least one means for sensing weight which senses a weight transferred through the support to the frame and which provides an ouput of the sensed weight; *and wherein the at least one means for sensing weight comprises at least one load cell for being loaded with weight of the seed container and any seeds therein transferred from the seed container through each load cell to the frame.*

5. A seed planer comprising:
a frame having a plurality of wheels for supporting the planter during rolling over a surface of ground to be planted with seeds;
a seed container for containing seeds to be planted in the ground;
a support which is joined to the frame and to the seed container for transferring weight of the seed container and any seeds therein to the frame, the support including at least one means for sensing weight which senses a weight of the seed container and any seeds therein transferred through the support to the frame and provides an output of the sensed weight; and
a planting mechanism which receives seeds contained in the seed container and plants the seeds received from the container below the ground; *and wherein the at least one means for sensing weight comprises at least one load cell associated with the support.*

7. A method for modifying a seed planter including a frame having a plurality of wheels for supporting the seed planter during rolling over a surface of ground to be planted with seeds, a seed container joined to the frame for containing seed to be planted, and a planting mechanism which plants seeds received from the container below the ground comprising:
raising the seed container upward from the frame to separate the seed container from being joined to the frame;
positioning a support between the seed container and the frame to join the support to the frame and to the seed container to support the seed container in a raised position above the frame, the positioned support transferring weight of the seed container and any seeds therein to the frame and including at least one means for sensing weight which senses a weight of the seed container and any seeds therein transferred through the support to the frame and which provides an output of the sensed weight; and
the planting mechanism receiving seeds contained in the seed container and planting the seeds received from the container below the ground; *and wherein the at least one means for sensing weight comprises at least one load cell associated with the support.*

9. A method for modifying a seed planter including a frame having a plurality of wheels for supporting the seed planter during rolling over a surface of ground to be planted with seeds, a seed container joined to the frame for containing seed to be planted, and a planting mechanism which plants seeds received from the seed container below the ground comprising:
raising the seed container upward from the frame to separate the seed container from being joined to the frame;
positioning a support between the seed container and the frame to join the support to the frame and to the seed container to support the seed container above the frame, the positioned support transferring weight of the seed container and any seeds therein to the frame;
at least one means for sensing weight which senses a weight of the seed container and any seeds therein transferred through the support to the frame and which provides an output of the sensed weight of the seed container and any seeds therein including during planting of the seeds during rolling over the surface of the ground; and
the planting mechanism receiving seeds contained in the seed container and planting the seeds received from the container below the ground; *and wherein*

*the at least one means for sensing weight comprises at least one load cell associated with the support.*

11. A scale for use with a seed planter including a frame supported by ground engaging wheels, a seed container for containing seeds and being supported by a frame, a planting mechanism which plants the seeds contained in the seed container below the ground which flow from the seed container to the planting mechanism while the ground engaging wheels roll across the ground during planting of the seeds in the ground, the scale comprising at least one means for sensing weight of the seed container that suspends the seed container, the at least one means for sensing weight being mounted so that weight of the seed container and any seeds therein is supported through the at least one means for sensing weight and providing an output of the sensed weight; and wherein the at least one means for sensing weight comprises at least one load cell.

13. A method of planting seeds with a seed planter including a frame including a plurality of wheels for rolling over a surface of ground to be planted with seeds, a seed container for containing seeds to be planted in the ground, a support which is joined to the frame and to the seed container to transfer weight of the seed container to the frame, the support including at least one means for sensing weight which senses a weight transferred through the support to the frame and which provides an output of sensed weight, and a planting mechanism which receives seeds contained in the seed container and plants the seeds received from the seed container below the ground comprising:

in response to the output of the sensed weight displaying with a display a weight of the seeds contained in the seed container while planting seeds in the ground with the planting mechanism; *and wherein*

*the at least one means for sensing weight comprises at least one load cell for being loaded with weight of the seed container and any seeds therein transferred from the seed container through the at least one load cell to the frame.*

17. A method of planting seed with a seed planter including a frame having a plurality of wheels for supporting the planter during rolling over a surface of ground to be planted with seeds, a seed container for containing seeds to be planted in the ground, a support which is joined to the frame and to the seed container to transfer weight of the seed container and any seeds therein to the frame, the support including at least one means for sensing weight which senses a weight of the seed container and any seeds therein transferred through the support to the frame and provides an output of the sensed weight, and a planting mechanism which receives seeds contained in the seed container and plants the seeds received from the seed container below the ground comprising:

in response to the output of the sensed weight displaying with a display a weight of the seeds contained in the seed container while planting seeds in the ground with the planting mechanism; *and wherein*

*the at least one means for sensing weight comprises at least one load cell associated with the support.*

21. A method of planting seeds with a scale provided by a seed planter including a frame supported by the ground engaging wheels, a seed container for containing seeds which is supported by a frame, a planting mechanism which plants the seeds contained in the seed container below the ground which flows from the seed container to the planting mechanism while the ground engaging wheels roll across the ground during planting of the seeds in the ground, the scale comprising at least one means for sensing the weight of the seed container so that weight of the seed container and seeds therein is supported through the at least one means for sensing weight and providing an output of the sensed weight comprising:

in response to the output of the sensed weight displaying with a display a weight of the seeds contained in the seed container while planting seeds in the ground with the planting mechanism; *and wherein*

*the at least one means for sensing weight comprises at least one load cell for being loaded with weight of the seed container and any seeds therein transferred from the seed container through the at least one load cell to the frame.*

25. A seed planter comprising:

a frame including a plurality of wheels for rolling over a surface of ground to be planted with seed;

seed containers for containing seeds to be planted in the ground;

a support which is joined to the frame and to the seed containers for transferring weight of the seed containers to the frame, the support including a plurality of means for sensing weight of the seed containers which sense weight transferred through the support to the frame and which provides an output of sensed weight with at least one means for sensing weight being associated with each seed container; and a planting mechanism which receives seeds contained in the seed containers and plants the seeds received from the seed containers below the ground; *and wherein*

*the plurality of means for sensing weight comprise load cells for being loaded with weight of the seed containers and any seeds therein transferred from the seed containers through the load cells to the frame.*

27. A method for modifying a seed planter including a frame including a plurality of wheels for rolling over a surface of ground to be planted with seeds, seed containers joined to the frame for containing the seeds to be planted and a planting mechanism which receives seeds contained in the seed containers and plants seeds received from the seed containers below the ground comprising:

separating the seed containers from being joined to the frame; and positioning a support between the seed containers and the frame to join the support to the frame and to the seed containers, the positioned support transferring weight of the seed containers and any seeds therein to the frame and including a plurality of means for sensing weight which sense a weight transferred through the support to the frame from the container and which provides an output of the sensed weight with at least one means for sensing weight being associated with each seed container; *and wherein*

*the plurality of means for sensing weight comprise load cells for being loaded with weight of the seed containers and any seeds therein transferred from the seed containers through the load cells to the frame.*

29. A seed planter comprising:

a frame having a plurality of wheels for supporting the planter during rolling over a surface of ground to be planted with seeds;

seeds containers for containing seeds to be planted in the ground;

a support which is joined to the frame and to the seed containers for transferring weight of the seed containers and any seeds therein to the frame, the support including a plurality of means for sensing weight which sense weight of the seed containers and any seeds therein transferred through the support to the frame and provides an output of the sensed weight with at least one means for sensing weight being associated with each seed container; and a planting mechanism which receives seeds contained in the seed containers and plants the seeds received from the container below the ground *and wherein*

*the plurality of means for sensing weight comprise load cells associated with the support.*

31. A method for modifying a seed planter including a frame having a plurality of wheels for supporting the seed planter during rolling over a surface of ground to be planted with seeds, seed containers joined to the frame for containing seeds to be planted, and a planting mechanism which plants seeds received from the seed containers below the ground comprising:

raising the seed containers upward from the frame to separate the seed containers from being joined to the frame;

positioning a support between the seed containers and the frame to join the support to the frame and to the seed containers to support the seed containers in a raised position above the frame, the positioned support transferring weight of the seed containers and any seeds therein to the frame and including a plurality of means for sensing weight which sense a weight of the seed containers and any seeds therein transferred through the support to the frame and which provides an output of the sensed weight with at least one means for sensing weight being associated with each seed container; and the planting mechanism receiving seeds contained in the seed containers and planting the seeds received from the seed containers below the ground; *and wherein*

*the plurality of means for sensing weight comprise load cells associated with the support.*

33. A method for modifying a seed planter including a frame having a plurality of wheels for supporting the seed planter during rolling over a surface of ground to be planted with seeds, seed containers joined to the frame for containing seeds to be planted, and a planting mechanism which plants seeds received from the seed containers below the ground comprising:

raising the seed containers upward from the frame to separate the seed containers from being joined to the frame;

positioning a support between the seed containers and the frame to join the support to the frame and to the seed containers to support the seed containers above the frame, the positioned support transferring weight of the seed containers and any seeds therein to the frame;

a plurality of means for sensing weight which sense a weight of the seed containers and any seeds therein transferred through the support to the frame and which provides an output of the sensed weight of the seed containers and any seeds therein including during planting of the seeds during rolling over the surface of the ground with at least one means for sensing weight being associated with each seed container; and the planting mechanism receiving seeds contained in the seed containers and planting the seeds received from the seed containers below the ground; *and wherein*

*the plurality of means for sensing weight comprise load cells associated with the support.*

35. A scale for use with a seed planter including a frame supported by the ground engaging wheels, seed containers for containing seeds and being supported by the frame, a planting mechanism which plants the seeds contained in the seed containers below the ground which flow from the seed containers to the planting mechanism while the ground engaging wheels roll across the ground during planting of the seeds in the ground, the scale comprising a plurality of means for sensing weight of the seed containers that suspends the seed containers from the frame, the plurality of means for sensing weight being mounted so that weight of the seed containers and any seeds therein is supported by the frame through the plurality of means for sensing weight and providing an output of the sensed weight with at least one means for sensing weight being associated with each seed container; *and wherein*

*the plurality of means for sensing weight comprises load cells.*

37. A method for planting seeds with seed planter including a frame including a plurality of wheels for rolling over a surface of ground to be planted with seeds, seed containers for containing seeds to be planted in the ground, a support which is joined to the frame and to the seed containers to transfer weight of the seed containers to the frame, the support including a plurality of means for sensing weight which sense weight transferred through the support to the frame and which provides an output of sensed weight with at least one means for sensing being associated with each seed container, and planting mechanism which receives seeds contained in the seed containers and plants the seeds received from the seed containers below the ground comprising:

in response to the output of the sensed weight displaying with a display a weight of the seeds contained in the seed containers while planting seeds in the ground with the planting mechanism; *and wherein*

*the plurality of means for sensing weight comprise load cells for being loaded with weight of the seed containers and any seeds therein transferred from the seed containers through the load cells to the frame.*

41. A method of planting seeds with a seed planter including a frame having a plurality of wheels for supporting the planter during rolling over a surface of ground to be planted with seeds, seed containers for containing seeds to be planted in the ground, a support which is joined to the frame and to the seed containers to transfer weight of the seed containers and any seeds therein to the frame, the support including a plurality of means for sensing weight which senses a weight of the seed containers and any seeds therein transferred through the support to the frame with at least one means for sensing weight being associated with each seed container and provides an output of the sensed weight, and a planting mechanism which receives seeds contained in the seed containers and plants the seeds received from the seed containers below the ground comprising:

in response to the output of the sensed weight displaying with a display a weight of the seeds contained in the seed containers while planting seeds in the ground with the planting mechanism; *and wherein*

*the plurality of means for sensing weight comprise load cells associated with the support.*

45. A method of planting seeds with a scale associated with a seed planter including a frame supported by ground engaging wheels, seed containers for containing seeds which are supported by a frame, a planting mechanism which plants the seeds contained in the seed containers below the ground which flow from the seed containers to the planting mechanism while the ground engaging wheels roll across the ground during planting of the seeds in the ground, the scale including a plurality of means for sensing weight of the seed containers so that weight of the seed containers and seeds therein is supported by the plurality of means for sensing weight with at least one means for sensing being associated with each seed container and providing an output of the sensed weight comprising:

in response to the output of the sensed weight displaying with a display a weight of the seeds contained in the seed containers while planting seeds in the ground with the planting mechanism; *and wherein*

*the plurality of means for sensing weight comprises load cells for being loaded with weight of the seed containers and any seeds therein transferred from the seed containers through the load cells to the frame.*

49. A method in accordance with claim 3, comprising using a sensed weight of seeds in the container during planting to determine a weight of seeds being planted per unit area.

50. A method in accordance with claim 49 comprising varying a rate of seeds planted from the determined weight of seeds planted per unit area to a desired weight of seeds planted per unit area.

51. A method in accordance with claim 7, comprising using a sensed weight of seeds in the container during planting to determine a weight of seeds being planted per unit area.

52. A method in accordance with claim 51, comprising varying a rate of seeds planted from the determined weight of seeds planted per unit area to a desired weight of seeds planted per unit area.

53. A method in accordance with claim 9, comprising using a sensed weight of seeds in the container during planting to determine a weight of seeds being planted per unit area.

54. A method in accordance with claim 53, comprising varying a rate of seeds planted from the determined weight of seeds planted per unit area to a desired weight of seeds planted per unit area.

55. A method in accordance with claim 13, wherein prior to planting of the seed, the seed container is separated from the frame and the support is positioned between the seed container and the frame so that a weight of seed in the seed container is sensed by the at least one load cell.

56. A method in accordance with claim 49 comprising using a sensed weight of seeds in the container during planting to determine a weight of seeds being planted per unit area.

57. A method in accordance with claim 56 comprising varying a rate of seeds planted from the determined weight of seeds planted per unit area to a desired weight of seeds planted per unit area.

58. A method in accordance with claim 14 comprising varying a rate of seeds planted from the determined weight of seeds planted per unit area to a desired weight of seeds planted per unit area.

59. A method in accordance with claim 17, wherein prior to planting the seed, the seed container is separated from the frame and the support is positioned between the seed container and the frame so that the weight of seed in the seed container is sensed by the at least one load cell.

60. A method in accordance with claim 59, comprising using a sensed weight of seeds in the container during planting to determine a weight of seeds being planted per unit area.

61. A method in accordance with claim 60 comprising varying a rate of seeds planted from the determined weight of seeds planted per unit area to a desired weight of seeds planted per unit area.

62. A method in accordance with claim 18 comprising varying a rate of seeds planted from the determined weight of seeds planted per unit area to a desired weight of seeds planted per unit area.

63. A method in accordance with claim 21, wherein prior to planting of the seed, the seed container is separated from the frame and a support is positioned between the seed container and the frame so that a weight of seed in the seed container is sensed by the at least one load cell.

64. A method in accordance with claim 63, comprising using a sensed weight of seeds in the container during planting to determine a weight of seeds being planted per unit area.

65. A method in accordance with claim 64 comprising varying a rate of seeds planted from the determined weight of seeds planted per unit area to a desired weight of seeds planted per unit area.

66. A method in accordance with claim 22, comprising varying a rate of seeds planted from the determined weight of seeds planted per unit area to a desired weight of seeds planted per unit area.

67. A method in accordance with claim 27, comprising using a sensed weight of seeds in the seed containers during planting to determine a weight of seeds being planted per unit area.

68. A method in accordance with claim 67 comprising varying a rate of seeds planted from the determined weight of seeds planted per unit area to a desired weight of seeds planted per unit area.

69. A method in accordance with claim 31, comprising using a sensed weight of seeds in the seed containers during planting to determine a weight of seeds being planted per unit area.

70. A method in accordance with claim 69 comprising varying a rate of seeds planted from the determined weight of seeds planted per unit area to a desired weight of seeds planted per unit area.

71. A method in accordance with claim 33, comprising using a sensed weight of seeds in the seed containers during planting to determine a weight of seeds being planted per unit area.

72. A method in accordance with claim 71 comprising varying a rate of seeds planted from the determined weight of seeds planted per unit area to a desired weight of seeds planted per unit area.

73. A method in accordance with claim 37, wherein prior to planting of the seed, the seed containers are separated from the frame and the support is positioned between the seed containers and the frame so that the weight of seed in the seed containers is sensed by the load cells.

74. A method in accordance with claim 73, comprising using a sensed weight of seeds in the containers during planting to determine a weight of seeds being planted per unit area.

75. A method in accordance with claim 74 comprising varying a rate of seeds planted from the determined weight of seeds planted per unit area to a desired weight of seeds planted per unit area.

76. A method in accordance with claim 38 comprising varying a rate of seeds planted from the determined weight of seeds planted per unit area to a desired weight of seeds planted per unit area.

77. A method in accordance with claim 41, wherein prior to planting of the seed, the seed containers are separated from the frame and the support is positioned between the seed containers and the frame so that the weight of seed in the seed containers is sensed by the load cells.

78. A method in accordance with claim 77, comprising using a sensed weight of seeds in the containers during planting to determine a weight of seeds being planted per unit area.

79. A method in accordance with claim 78 comprising varying a rate of seeds planted from the determined weight of seeds planted per unit area to a desired weight of seeds planted per unit area.

80. A method in accordance with claim 42 comprising varying a rate of seeds planted from the determined weight of seeds planted per unit area to a desired weight of seeds planted per unit area.

81. A method in accordance with claim 45, wherein prior to planting of the seed, the seed containers are separated from the frame and a support is positioned between the seed containers and the frame so that the weight of seed in the seed containers is sensed by the load cells.

82. A method in accordance with claim 81, comprising using a sensed weight of seeds in the containers during planting to determine a weight of seeds being planted per unit area.

83. A method in accordance with claim 82 comprising varying a rate of seeds planted from the determined weight of seeds planted per unit area to a desired weight of seeds planted per unit area.

84. A method in accordance with claim 46 comprising varying a rate of seeds planted from the determined weight of seeds planted per unit area to a desired weight of seeds planted per unit area.

* * * * *